United States Patent [19]
Levy et al.

[11] Patent Number: 6,092,175
[45] Date of Patent: Jul. 18, 2000

[54] SHARED REGISTER STORAGE MECHANISMS FOR MULTITHREADED COMPUTER SYSTEMS WITH OUT-OF-ORDER EXECUTION

[75] Inventors: Henry M. Levy; Susan J. Eggers; Jack Lo, all of Seattle, Wash.; Dean M. Tullsen, San Diego, Calif.

[73] Assignee: University of Washington, Seattle, Wash.

[21] Appl. No.: 09/053,903

[22] Filed: Apr. 2, 1998

Related U.S. Application Data

[60] Provisional application No. 60/041,803, Apr. 3, 1997, and provisional application No. 60/041,802, Apr. 3, 1997.

[51] Int. Cl.[7] ........................................ G06F 9/38
[52] U.S. Cl. ................................ 712/23; 712/215
[58] Field of Search .................... 712/23, 215, 217, 712/228

[56] References Cited

U.S. PATENT DOCUMENTS

| | | | |
|---|---|---|---|
| 5,404,469 | 4/1995 | Chung | 712/24 |
| 5,564,031 | 10/1996 | Amerson | 711/209 |
| 5,630,149 | 5/1997 | Bluhm | 712/217 |
| 5,826,070 | 10/1998 | Olson | 712/222 |
| 5,867,725 | 2/1999 | Fung | 712/23 |
| 5,913,059 | 6/1999 | Torii | 709/5 |
| 5,941,977 | 8/1999 | Panwar | 712/23 |
| 5,996,068 | 11/1999 | Dwyer | 712/228 |

*Primary Examiner*—Eric Coleman
*Attorney, Agent, or Firm*—Ronald M. Anderson

[57] ABSTRACT

A method and organization for implementing the registers required in a computer system supporting multithreading and dynamic out-of-order execution. Multithreaded computer systems are those in which the processor supports multiple contexts (threads), and either rapid context switching from thread to thread or scheduling of instructions from different threads within a single cycle. An important component of processors for such systems is the register file; the processor needs a large register file or resource to provide the registers used for the threads. One form of the invention maintains a set of private architecturally specified registers, and a set of private renaming register for each different thread. In the other three embodiments, sharing of renaming registers between different threads is permitted, to enable a reduction in the total number of registers required. One of these three embodiments enables any of the architecturally specified registers that are private to a thread but are not in use, to be employed as renaming registers. Another of the embodiments treats all registers as sharable and enables any register from the register file or resource to be used as a renaming register for any thread.

14 Claims, 13 Drawing Sheets

```
1 ldl    r20, addr1 (r22)
2 ldl    r21, addr2 (r23)
3 addl   r20, r21, r12
4 addl   r21, 0x1, r21
    ....
5 stl    r12, addr3 (r21)
6 ldl    r20, addr4 (r29)
```

```
ldl     r20, addr1 (r22)
ldl     r21, addr2 (r23)
addl    r20, r21, r12
addl    r21, ox1, r21
   ...
stl     r12, addr3 (r21)
ldl     r20, addr4 (r29)
```

```
ldl     r20, addr1 (r22)
frl     r22
ldl     r21, addr2 (r23)
frl     r23
addl    r20, r21, r12
frl     r20
addl    r21, ox1, r21
   ...
stl     r12, addr3 (r21)
frl     r12, r21
ldl     r20, addr4 (r29)
frl     r29
```

```
ldl    r20, addr1frl      r22
ldl    r21, addr2 (r23)
addl   r20, r21, r12
addl   r21, ox1, r21
       ...
stl    r12, addr3 (r21)
ldl    r20, addr4 (r29)
lda    r29, 0x1000 (r31); MASK FOR REG 12
ldah   r29, 0x20f0 (r12); MASK FOR REGS 20, 21, 22, 23, 29
fml    r29               ; FREE INT REGISTERS IDENTIFIED BY MASK
```
FIG. 11C
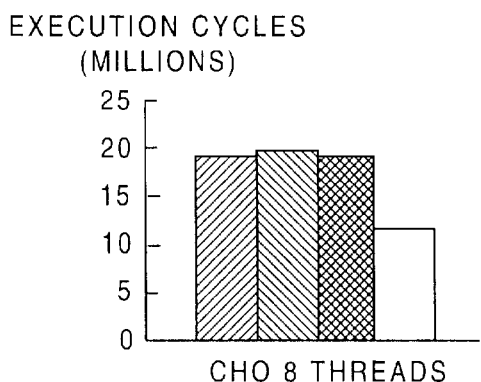
FIG. 12A
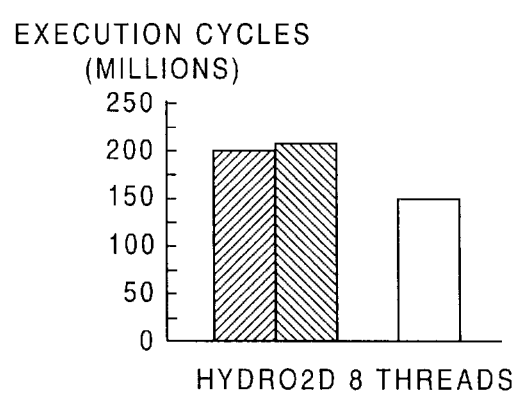
FIG. 12B
Legend:
- FSR8
- FSR8 FREE REGISTER
- FSR8 FREE MASK
- FSR8 FREE REGISTER BIT
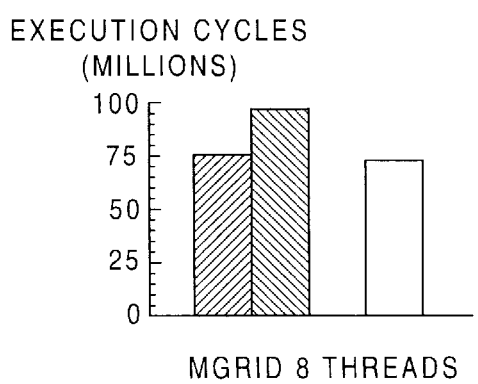
FIG. 12C
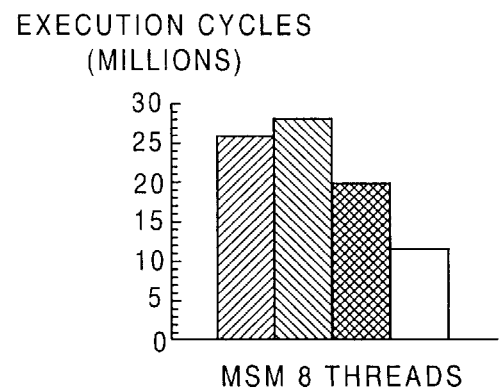
FIG. 12D

SHARED REGISTER STORAGE MECHANISMS FOR MULTITHREADED COMPUTER SYSTEMS WITH OUT-OF-ORDER EXECUTION

RELATED APPLICATIONS

This application is a continuation-in-part of previously filed U.S. Provisional Patent Applications, U.S. Ser. Nos. 60/041,803, and 60/041,802, both filed on Apr. 3, 1997, the benefit of the filing dates of which is hereby claimed under 35 U.S.C. § 119(e).

FIELD OF THE INVENTION

The invention relates to high-performance processors that employ multithreading and out-of-order execution, and more specifically, to organizing processor register storage so as to reduce the number of registers required and to increase the performance of a given number of registers.

BACKGROUND OF THE INVENTION

Modern processors employed in computer systems use various techniques to improve their performance; one of these techniques is multithreading. A multithreaded computer system contains hardware support for multiple threads of execution. The threads can be independent programs or related execution streams of a single parallel program, or both. The hardware typically supports (1) rapid switching of threads on long-latency operations, i.e., "coarse-grained or block multithreading," (2) rapid switching of threads on a cycle by cycle basis, i.e., "fine-grained multithreading," or (3) scheduling of instructions from multiple threads within a single cycle, i.e., "simultaneous multithreading." To support this rapid switching or simultaneous instruction selection, the processor must contain register sets for multiple thread contexts. The size of the register file is thus an important consideration in the design of such processors.

A second crucial technique typically used to improve the performance of a modern processor is dynamic instruction scheduling in which processor hardware can execute instructions out of order, i.e., in an order different than that specified by the programmer or compiler. The hardware can allow out-of-order execution as long as it ensures that the results of the computation are identical to the specified in-order execution. To enable this technique to achieve performance improvement, the hardware provides a set of physical registers called "renaming registers," which are in addition to the "architectural registers" that are visible to the programmer.

The renaming registers permit more parallelism, because they allow the hardware to allocate a new renaming register to represent an architectural register when the processor detects the start of a new definition of that architectural register; i.e., when hardware detects the loading of a new value into a register. By using a new renaming register to represent this redefinition of the architectural register, a new stream of execution can begin in parallel with the use of the original register.

It is believed that multithreading and out-of-order execution of instructions have not yet been combined in a single processor. The combination of multithreading and dynamic out-of-order execution techniques are expected to cause a substantial increase in the number of physical registers needed by a processor.

Large register files are a concern for both multithreaded architectures and processors with register windows, as evidenced by the following prior art references. In a paper entitled "Register Relocation: Flexible Contexts for Multithreading," $20^{th}$ Annual International Symposium on Computer Architecture, pages 120–129, May 1993, C. A. Waldspurger and W. E. Weihl proposed compiler and runtime support for managing multiple register sets in the register file. The compiler tries to identify an optimum number of registers for each thread, and generates code using that number of registers. The runtime system then tries to dynamically pack the register sets from all active threads into the register file. Also, in a paper entitled, "The Named-State Register File: Implementation and Performance,"$1^{st}$ Annual International Symposium on High-Performance Computer Architecture, January 1995, P. R. Nuth and W. J. Dally proposed the named state register file as a cache for register values. The full register name space is backed by memory, but active registers are dynamically mapped to a small, fast set of registers. This design exploits both the small number of simultaneously active registers and the locality characteristics of register values. For its SPARC™ processor with register windows, Sun Corporation designed 3-D register files to reduce the required chip area, as described by M. Tremblay, B. Joy, and K. Shin in "A Three Dimensional Register File for Superscalar Processors," Hawaii International Conference on System Sciences, pages 191–201, January 1995. Because only one register window can be active at any time, the density of the register file can be increased by overlaying multiple register cells so that they share wires.

Several papers have investigated register lifetimes and other register issues. For example, in "Register File Design Considerations in Dynamically Scheduled Processors," $2^{nd}$ Annual International Symposium on High-Performance Computer Architecture, January 1996, K. I. Farkas, N. P. Jouppi, and P. Chow compared the register file requirements for precise and imprecise interrupts and their effects on the number of registers needed to support parallelism in an out-of-order machine. They also characterized the lifetime of register values, by identifying the number of live register values present in various stages of the renaming process, and investigated cycle time tradeoffs for multi-ported register files.

J. Janssen and H. Corporaal, in "Partitioned Register Files for TTAs," $28^{th}$ International Symposium on Microarchitecture, pages 303–312, December 1995, A. Capitanio et al. in "Partitioned Register Files for VLIWs," $25^{th}$ International Symposium on Microarchitecture, pages 292–300, December 1992, and J. Llosa et al., in "Non-Consistent Dual Register Files to Reduce Register Pressure," $1^{st}$ Annual International Symposium on High-Performance Computer Architecture, pages 22–31, January 1995, investigated techniques for handing large register files, including partitioning, limited connectivity, and replication. Kiyohara et al., in "Register Connections: A New Approach to Adding Registers into Instruction Set Architecture," $20^{th}$ Annual International Symposium on Computer Architecture, pages 247–256, May 1993, proposed a technique for handling larger register files by adding new opcodes to address the extended register file.

Based upon the preceding prior art references, it will be apparent that a flexible approach is needed for sharing physical registers among threads in such a way as to reduce the total register requirement. The approach used should improve the performance of a given number of registers, reduce the number of physical registers required to support a given number of threads with a given level of performance, and simplify the processor organization. Currently, the prior art does not disclose or suggest such an approach.

SUMMARY OF THE INVENTION

In accord with the present invention, a method is defined for assigning registers for use by a multithreaded processor that is capable of executing instructions from a plurality of threads out-of-order. The plurality of threads can include threads running within a single application, threads running within different applications, and/or threads running for different processes. The method includes the step of providing a plurality of registers for use by the processor in executing the plurality of threads. At least some of these registers are useable as renaming registers. The renaming registers are dynamically allocated and assigned to a thread being processed by the multithreaded processor, as required to support out-of-order execution of instructions for the thread.

In a first preferred embodiment, at least some of the plurality of registers comprise sets of architectural registers; each set of architectural registers is private to a different one of the plurality of threads. In this embodiment, the renaming registers also comprise sets of renaming registers, each of which is private to a different one of the plurality of threads.

In another preferred embodiment, the renaming registers are dynamically allocatable and assignable to different threads at different times and are thus shared between the threads. Yet another embodiment provides that any of the architectural registers in a set that is currently not being used for a thread is temporarily usable as a renaming register, and if so used, is then temporarily assigned to another thread, to support out-of-order execution of instructions for that other thread. The processor determines that an architectural register in a set is temporarily usable as a renaming register by executing an instruction that indicates the architectural register is not currently being used for a thread.

In still another preferred embodiment, any of the plurality of registers are dynamically allocatable and assignable to any thread being executed by the multithreaded processor, for use as a renaming register. If a thread defines a new register value, a renaming register is then dynamically allocated from any of the plurality of registers not currently in use by the processor, for a lifetime of that register value for that thread. After use of the register value is complete, the renaming register is made available for reallocation and assignment to any thread, including that thread to which said renaming register was previously allocated and assigned. Architectural registers referenced in the instructions are preferably mapped to any of the plurality of registers that are available, for use as renaming registers.

A further aspect of the present invention is directed to a register resource for use in a multithreaded processor capable of out-of-order execution of instructions. The elements of this register resource are generally consistent in function with the steps of the method described above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 9 is a block diagram showing how the register handler maps architectural references in the instructions to renaming registers;

FIG. 10 is an example showing pseudo code to illustrate the register renaming process for architectural register r20;

FIGS. 11A–11C are code fragments illustrating the base or original code, the free register instructions (fr1), and the free mask instructions (fm1) necessary to free the same register;

FIGS. 12A–12G are graphs illustrating the execution cycles for the three register free mechanisms (i.e., free register, free mask, and free register bit) for the FSR8 configuration;

FIGS. 14A–46G are graphs comparing the execution cycles (or time) required for the base and free register bit FSR schemes for five different PAPR file sizes; and FIG. 15 is a block diagram illustrating the mapping of references to architectural registers to specific renaming registers.

DESCRIPTION OF THE PREFERRED EMBODIMENT

Figures 1, 2:
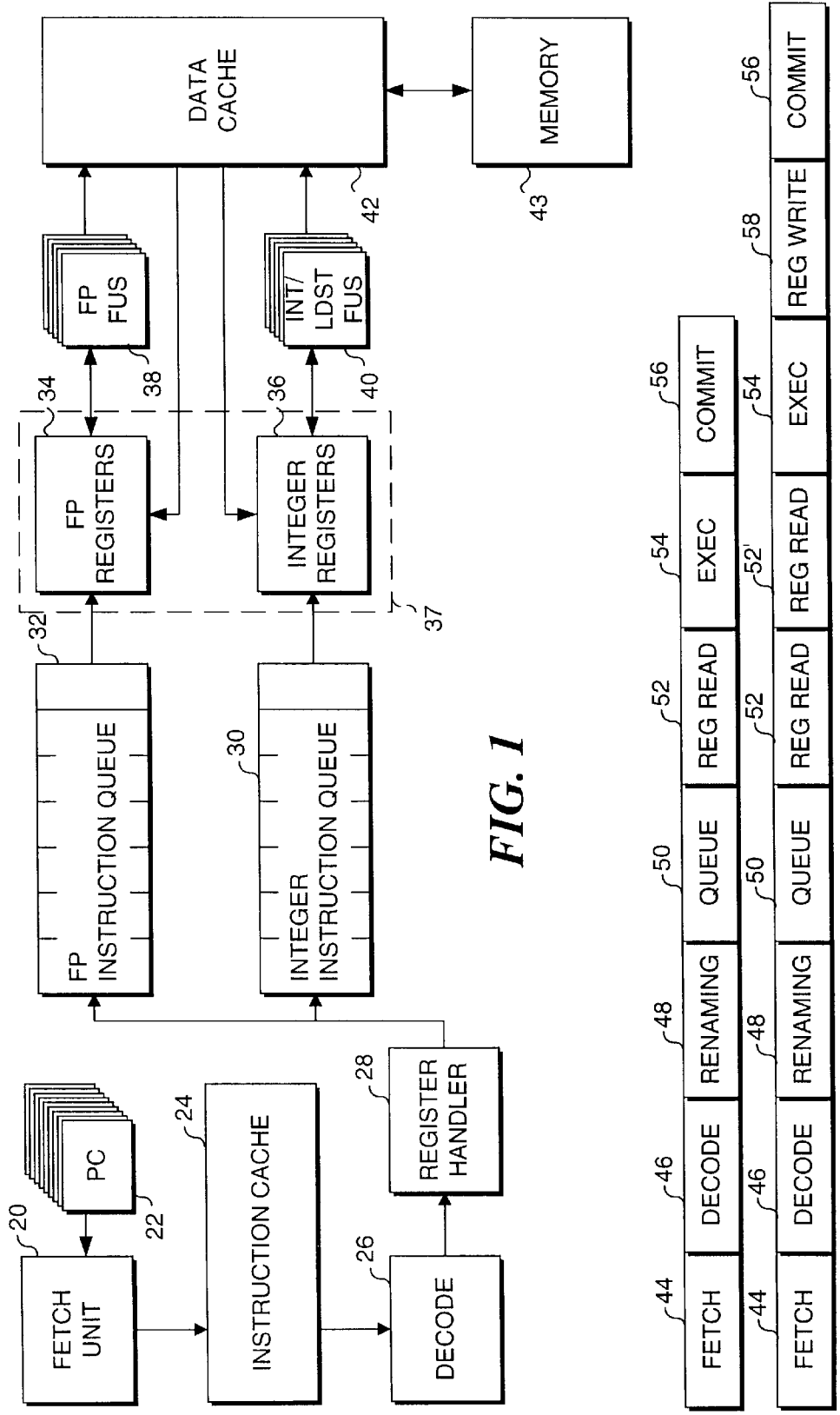
FIG. 1 is a schematic block diagram illustrating the functional organization of the simultaneous multithreaded (SMT) processor for which the present invention is applicable.
FIG. 2 are schematic block diagrams comparing a pipeline for a conventional superscalar processor (top row of blocks) and a modified pipeline for the SMT processor (bottom row of blocks)

In a conventional multithreaded processor, a processor contains a single register set with a number of architecturally-defined registers for each thread. For example, if the architecture defines 32 registers and the hardware supports four threads, then the processor will contain 4*32=128 registers. In a conventional dynamically-scheduled out-of-order processor, the hardware supports only one thread, but issues instructions out-of-order for that thread; the processor will thus contain the number of architecturally-defined registers, e.g., 32, plus additional registers for renaming, e.g., an additional 32 or more registers to support out-of-order execution for that single thread.

The present invention supports the simultaneous, dynamic, out-of-order execution of instructions from multiple threads. There are four preferred embodiments for the register organization of this invention, as described below. In a first preferred embodiment of the present invention, a processor contains multiple independent private per-thread register sets, each private set of which supports both the architectural needs of a single individual thread plus the renaming needs of that thread. In contrast, a second preferred embodiment is an organization supporting multiple, private per-thread architectural register sets, with shared renaming registers for use with all of the threads or sets. That is, for each of the multiple threads, the processor contains a private per-thread register set including the required number of architecturally-specified registers. However, in addition, the hardware also contains a single register file of renaming registers to support out-of-order execution; these renaming registers are shared across all threads, and the processor assigns registers from the renaming file to specific threads dynamically as they are required by those threads. An individual renaming register may thus be assigned to different threads at different points in time.

A third preferred embodiment of the present invention also supports multiple, private per-thread architectural registers, with shared renaming registers, just as described above in regard to the second preferred embodiment—but with one significant difference. It is possible on a multi-threaded architecture that at some points in time, the processor will be executing fewer threads than the number of private register sets contained in the processor. In other words, at such times, there will be an excess of the private register sets beyond what is required to execute the threads. Under such a condition, this third embodiment allows the per-thread registers for the unused thread contexts (those currently not loaded with executing threads) to be used as renaming registers, i.e., to be shared among the multiple executing threads, along with the dedicated shared renaming registers, and allocated in the same manner as the shared renaming registers. Therefore, in this embodiment, if fewer threads are executing than the maximum supported by the processor, those fewer threads can benefit from additional renaming registers (i.e., the "private" architecturally specified registers of the idle threads) that would not be available in the second embodiment.

The fourth preferred embodiment of the present invention enables the complete register file (also referred to herein as the "register resource") to be fully shared among all threads. In this embodiment, all registers for all threads are treated as dynamically-allocatable registers (e.g., renaming registers) for out-of-order execution. When a thread defines a new register value, a new renaming register is allocated from the shared register file for the lifetime of that register value for that thread. When the system detects that the usage of that register value is completed, i.e., that the register is no longer needed, the register is made available to be reassigned to that thread or any other thread, as subsequently required. In this embodiment, no distinction is made between architectural registers and registers for out-of-order execution; the hardware assigns registers from the file to threads on an as-needed basis, as long as registers are available. The following text discloses further details about these four embodiments.

Introduction

Advanced microprocessors, such as the MIPS R10000, DEC Alpha 21264, PowerPC 604, Intel Pentium Pro, and HP PA-RISC 8000, use dynamic, out-of-order instruction execution to boost program performance. Such dynamic scheduling is enabled by a large renaming register file, which, by dynamic renaming of architectural to physical registers, increases instruction-level parallelism. For example, the six-issue per cycle Alpha 21264 has 160 renaming registers (80 integer/80 floating point); the MIPS R10000 has 128 renaming registers (64 integer/64 floating point). While large increases in register file size can improve performance, they also pose a technical challenge due to a potential increase in register access time. The addition of latency-tolerating techniques, such as fine-grained multithreading or simultaneous multithreading, further exacerbates the problem by requiring multiple (per-thread) register sets, in addition to renaming registers.

Simultaneous multithreading (SMT) as used in the present invention, combines modern superscalar technology and multithreading to issue and execute instructions from multiple threads on every cycle, thereby exploiting both instruction-level and thread-level parallelism. By dynamically sharing processor resources among threads, SMT achieves higher instruction throughputs on both multiprogramming and parallel workloads than competing processor technologies, such as traditional fine-grain multithreading and single-chip shared memory multiprocessors.

With respect to its register requirements, SMT presents an interesting design point. On the one hand, it may require a large number of renaming registers; e.g., in a simulation of an eight-wide, eight-thread, out-of-order SMT processor, 32 architecturally specified registers may be required for each thread or context, plus 100 renaming registers, for a total of 356 registers. On the other hand, SMT presents a unique opportunity to configure and use the physical registers creatively, both to maximize register utilization and further increase instruction throughput, and to reduce implementation costs by decreasing either the size of the register file, the number of register ports, or both. This opportunity emerges from SMT's ability to share registers across contexts, just as it shares other processor resources.

Although SMT is the motivating architecture and the testbed employed for the preferred embodiments of the present invention, it is not the only architecture that could benefit from the architectural and compiler techniques of that invention. Traditional multithreaded processors, processors with register windows, and dynamically-scheduled processors with register renaming should also benefit, each in their own way.

The following specification discloses two approaches for improving register file performance (or alternatively, reducing register-file size) on out-of-order processors that require large register files. First, four alternatives are presented for organizing architectural and renaming registers on a multithreaded architecture. Test results reported below indicate that flexible register file organizations, in which at least some of the registers can be shared among threads, provide performance gains when compared to dedicated per-thread register designs. In addition, the flexibility permits the total register file size to be reduced without sacrificing performance. These test results also show that for some parallel applications, inter-thread register sharing is more important to performance than increased thread-level parallelism.

Even with the most flexible register file designs, instruction fetching may still stall, because all renaming registers are in use. The problem may not be due to an insufficient register file size, but rather, to poor register management. The second approach to improved register file performance used in the present invention is an architectural technique that permits the compiler to assist the processor in managing the renaming registers. Measurements demonstrate that hardware renaming is overly conservative in register reuse. The compiler, however, can precisely determine the live ranges of register contents pinpointing the times when reuse of a renaming register can occur. Furthermore, measurements show that with the most effective scheme in this invention, performance on smaller register files can be improved by 64% to match that of larger register files. Furthermore, it should be noted that this technique can be used to improve performance on any out-of-order processor.

Description of SMT as Used in the Present Invention

The SMT design model employed in connection with the present invention is an eight-wide, out-of-order processor with hardware contexts for eight threads as shown in FIG. 1. The SMT design model includes a fetch unit 20, which fetches instructions from an instruction cache 24, for each of a plurality of threads 22 being executed by the processor. Every cycle, the fetch unit fetches four instructions from each of two threads. The fetch unit favors high throughput threads, fetching from the two threads that have the fewest instructions waiting to be executed. After being fetched, the instructions are decoded, as indicated in a block 26, and a register handler 28 determines the registers from the register file or resource that will be used for temporarily storing values indicated in the instructions. Thus, the register handler implements the mapping of references to architecturally specified registers to specific renaming registers, in accord with one of the four preferred embodiments. The instructions are then inserted into either an integer (INT) instruction queue 30 or a floating point (FP) instruction queue 32. A register resource 37 is illustrated in this Figure that includes FP registers 34 and INT registers 36. (Details showing the configuration of register resource 37 for the four different preferred embodiments of the present invention are discussed below in regard to FIGS. 5A–5D.) Data output from FP FUs 38 and INT/load-store (LDST) FUs 40 are shifted into a data cache 42, for access by a memory 43. Finally, the instructions are retired in order after their execution is completed. FP FUs 38 and INT/LDST FUs 40 may operate on register operands; the FUs may also load or store data from the data cache or memory.

Figures 9, 10, 11A, 11B:
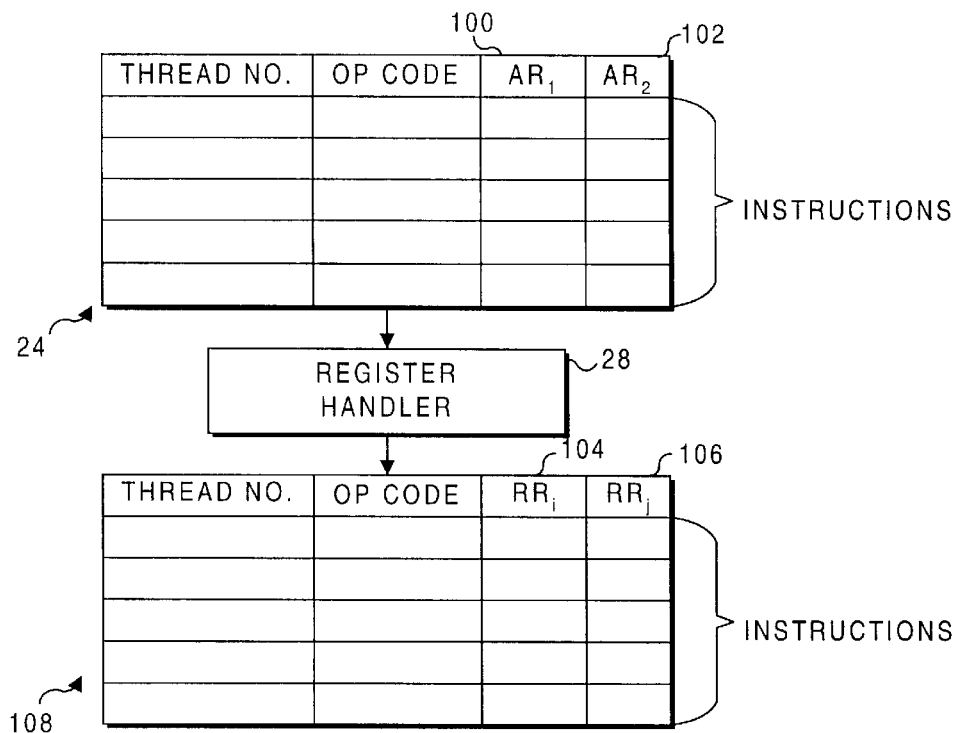
Figure 12E:
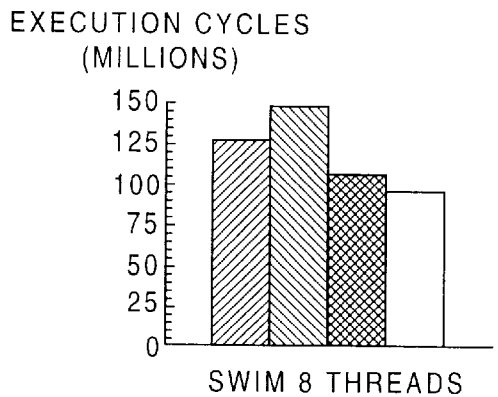
Figure 12F:
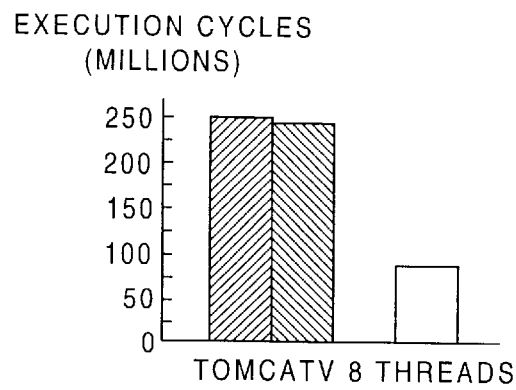
Figure 12G:
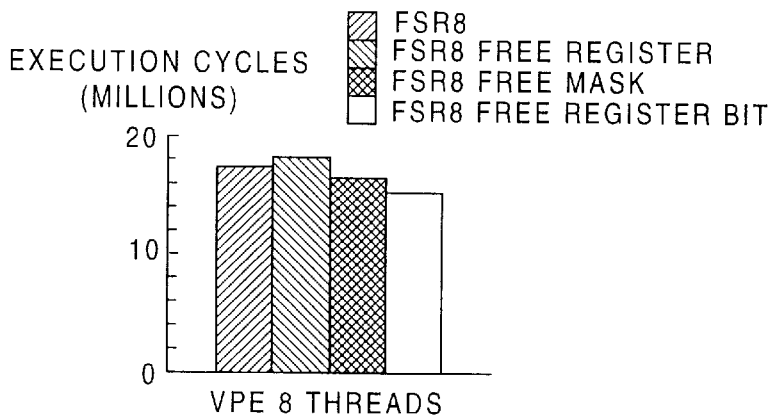
Figure 13A:
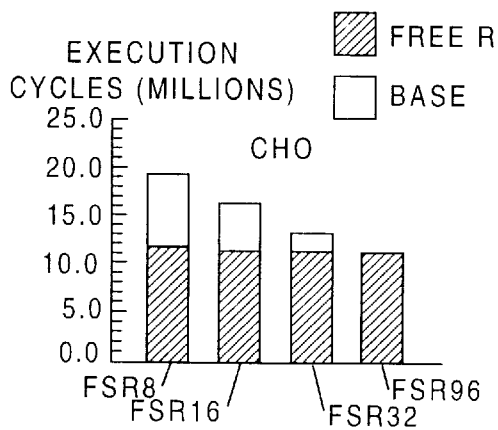
FIGS. 13A–13G are graphs comparing the execution cycles (or time) required for the base and free register bit for FSR schemes of different configurations with eight threads.
Figure 13B:
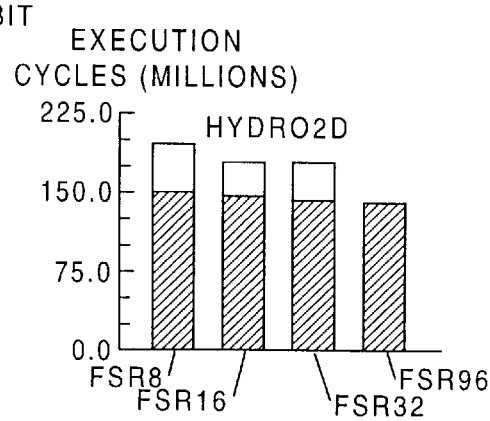
Figure 13C:
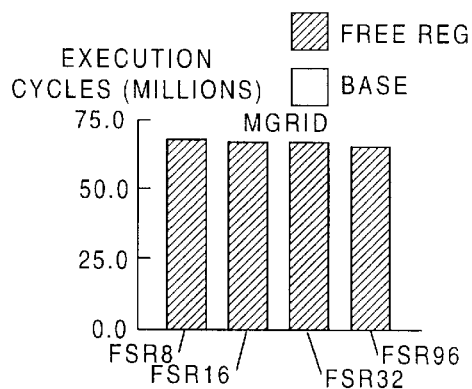
Figure 13D:
Figure 13E:
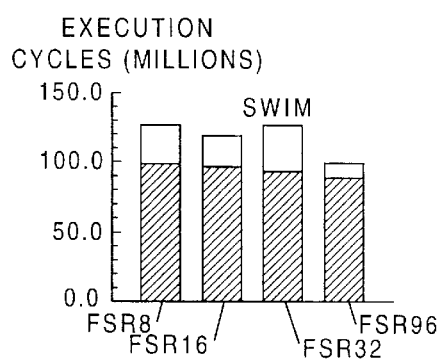
Figure 13F:
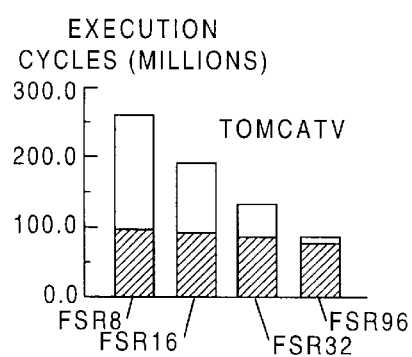
Figure 13G:
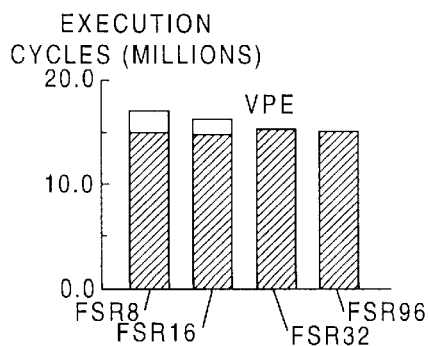
Figure 14A:
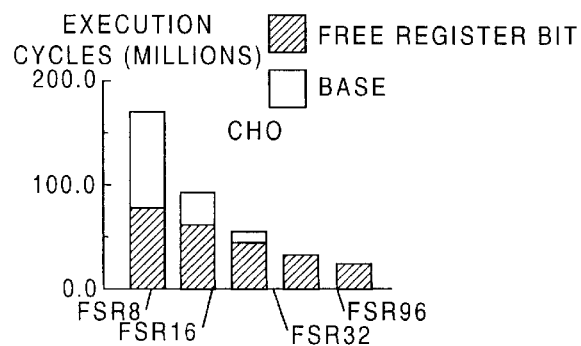
Figure 14B:
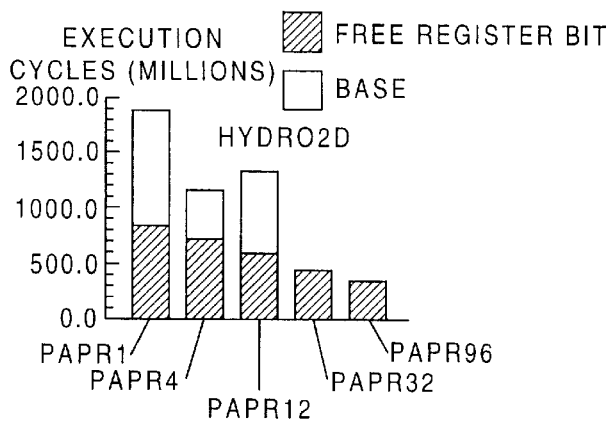
Figure 14C:
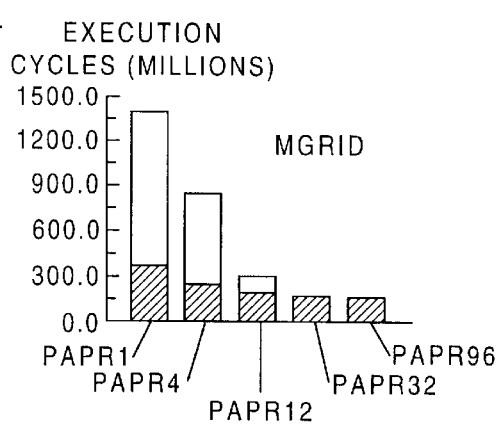
Figure 14D:
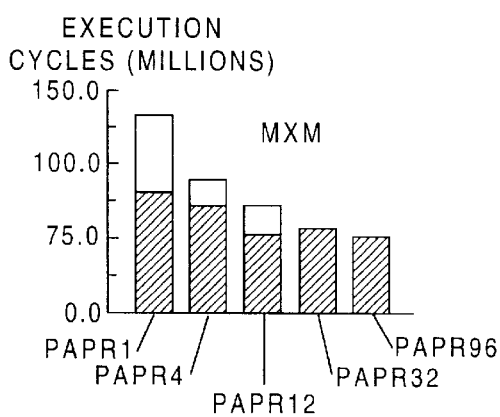
Figure 14E:
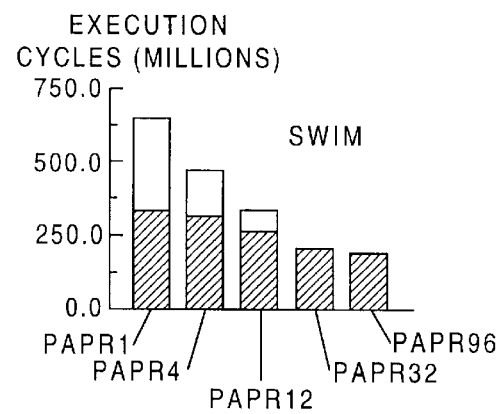
Figure 14F:
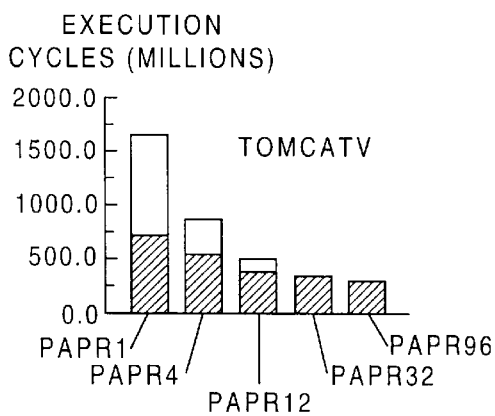
Figure 14G:
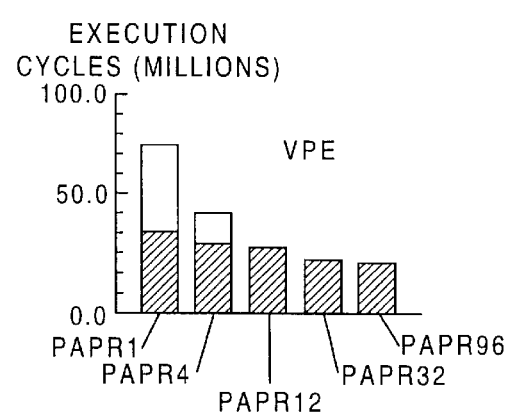

FIG. 9 illustrates how register handler 28 processes instructions indecoder 26 for each of the contexts of the threads being executed (in which architectural registers 100 and 102 are referenced) to allocate the values for the architectural registers to specific renaming registers 104 and 106. The renaming registers are selected from available renaming registers 108. This Figure is applicable to each of the four preferred embodiments of the present invention.

Figure 15:
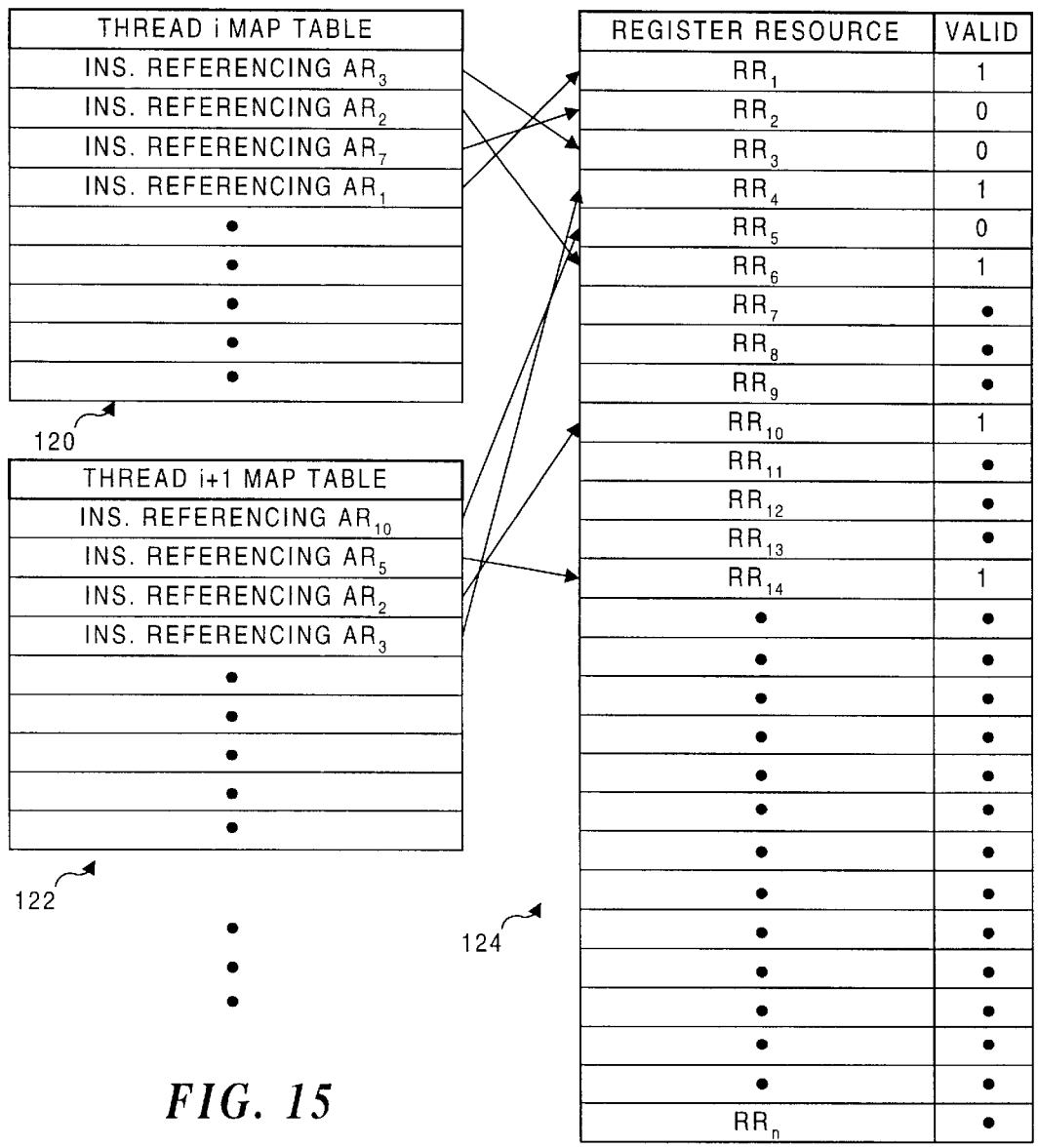

FIG. 15 illustrates how references to architectural references in instructions are mapped to renaming registers. For each different thread for which a context is being executed, architectural registers 120, 122, etc., (which are referenced by instructions) are mapped to available renaming registers in a list 124 of the renaming registers comprising the register resource. A "valid" column indicates (with a "0") when value allocated to a renaming register is no longer needed by a context, so that renaming registers are made available for reassignment. The value in the valid column is set by the processor in response to an instruction that indicates the use of a value stored in a renaming register is complete.

Very little new microarchitecture need be designed to implement or optimize the SMT employing the present invention—most components are an integral part of any conventional dynamically-scheduled superscalar. As shown in the top portion of FIG. 2, a conventional superscalar processor includes a fetch stage 44, a decode stage 46, a renaming stage 48, a queue 50, a register read stage 52, an execution stage 54, and a commit stage 56. These elements are also included in the SMT, as shown in the bottom of FIG. 2. The only additions are a larger register file (e.g., 32 architecturally specified registers per thread, plus 100 renaming registers), a register read stage 52' and a register write stage 58. The extended (longer) pipeline is needed to access the registers because of the two additional stages. Also needed for the SMT are the instruction fetch mechanism and the register handler mentioned above, and several per-thread mechanisms, including program counters, return stacks, retirement and trap mechanisms, and identifiers in the translation lookaside buffer (TLB) and branch target buffer. Notably missing from this list is special per-thread hardware for scheduling instructions onto the FUs. Instruction scheduling is done as in a conventional out-of-order superscalar, i.e., instructions are issued after their operands have been calculated or loaded from memory, without regard to thread, and the renaming handler eliminates inter-thread register name conflicts by mapping thread-specific architectural registers onto the physical registers, as explained below in regard to FIG. 15.

Instruction-level simulations indicate that this SMT architecture obtains speedups of 64% and 52% over two and four-processor single-chip multiprocessors, respectively, based on benchmarking applications executed from the SPLASH-2 and SPEC suites of benchmarks. (See "The SPLASH-2 Programs: Characterization and Methodological Considerations," S. C. Woo et al., 22nd Annual International Symposium on Computer Architecture, pages 23–36, June 1995; and "New CPU Benchmark Suites from SPEC," K. Dixit, COMPCON '92 Digest of Papers, pages 305–310, 1992.) The SMT architecture also achieves instruction throughputs 2.5 times that of the wide-issue superscalar on which it was based, executing a multiprogramming workload of SPEC 92 programs. (See "Exploiting Choice: Instruction Fetch and Issue on an Implementable Simultaneous Multithreading Processor," D. M. Tullsen et al., 23rd Annual International Symposium on Computer Architecture, pages 191–202, May 1996.)

Register File (Resource) Design

Before discussing various design issues for SMT register files (or register resources) as implemented in the present invention, it may be helpful to provide some background on register renaming. A processor's instruction set architecture determines the maximum number of registers that can be used for program values. On a machine with in-order execution, this limited size (typically 32 registers) often introduces artificial constraints on program parallelism, thus reducing overall performance. To keep the FUs busy each execution cycle, dynamically-scheduled processors rely on hardware register renaming to increase the pool of physical registers available to programs. The renaming hardware removes false data dependencies between architectural registers by assigning architectural registers with output or anti-dependencies to different physical registers to expose more instruction-level parallelism.

Because these dynamically-scheduled processors also rely heavily on speculative execution, hardware must be provided to maintain a consistent processor state in the presence of mispredicted branches and processor interrupts and exceptions. Most processors rely on an in-order instruction retirement mechanism to commit physical register values to architectural register state. Two different approaches are used: reorder buffers and register remapping.

Figure 3:
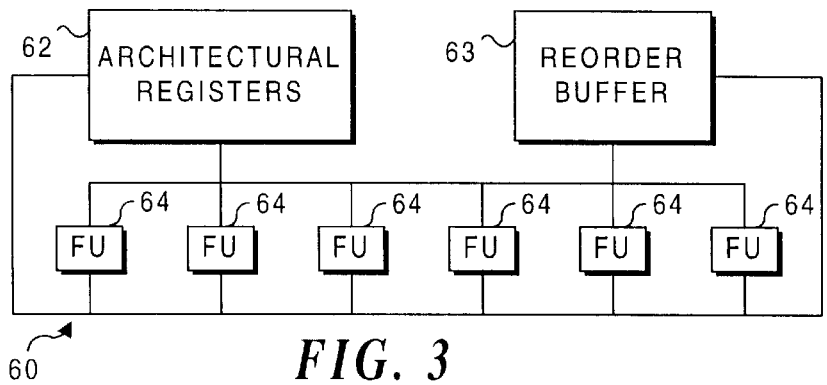
FIG. 3 is a block diagram illustrating a reorder buffer and register renaming in accord with the present invention.

Processors such as the PowerPC 604™, Intel Corporation's Pentium Pro™, and Hewlett Packard Corporation's PA-RISC 8000™ use a reorder buffer 63 (as shown in a block diagram 60 in FIG. 3). The reorder buffer differs slightly in these three processors, but in all cases, it serves two primary purposes, including providing support for precise interrupts, and assisting with register renaming. A set of physical registers backs architectural registers 62 and maintains the committed state of the program (consistent with in-order retirement) when servicing FUs 64. The FUs include such components as an adder, floating point unit, etc. The reorder buffer itself contains a pool of renaming registers (not separately shown). When an instruction with a register destination is dispatched, a renaming register in the reorder buffer is allocated. When a register operand is needed, the system hardware checks the renaming registers for the current value. If it is there, the instruction retrieves the operand value from the renaming register. If not, the operand is selected from the in-order, consistent set of physical registers. When an instruction retires, the renaming register value is written to the physical register file to update the committed processor state. Because entries in the reorder buffer are maintained in program order, speculative instructions caused by branch misprediction can be squashed by invalidating all reorder buffer entries after the branch. Exceptions can be handled in a similar fashion.

Figure 4:
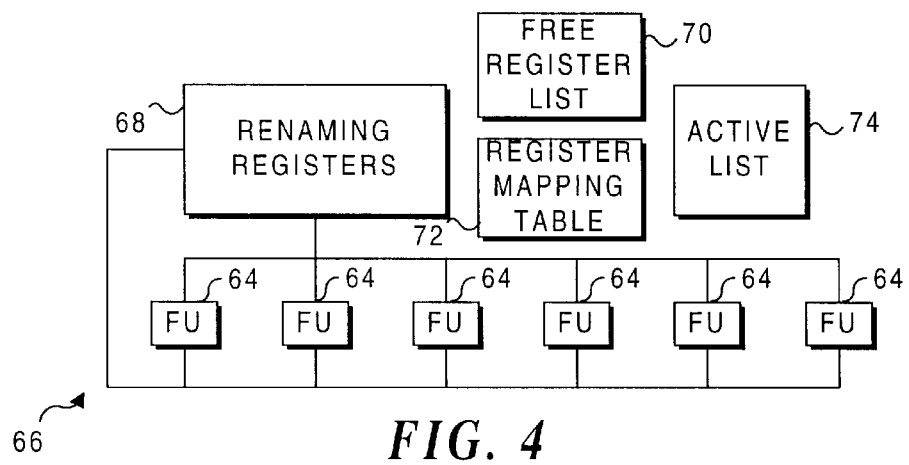
FIG. 4 is a block diagram showing the register renaming mapping table.

The MIPS R10000™ uses a register renaming mapping table scheme, as shown in a block diagram 66 in FIG. 4. An active list 74 keeps track of all uncommitted instructions in the machine, in program order (somewhat similar in functionality to reorder buffer 63 in FIG. 3). The register file includes a large pool of physical registers 68. When a physical register is needed (i.e., when the corresponding architectural register is defined), a mapping is created from the architectural register to an available physical register in a register mapping table 72. Also maintained is a free register list 70.

A four-entry branch stack (not separately shown) is used to support speculative execution. Each entry corresponds to an outstanding, unresolved branch and contains a copy of the entire register mapping table. If a branch is mispredicted, the register mapping table is restored from the corresponding branch stack entry, thus restoring a consistent view of the register state. On an exception, the processor restores the mapping table from the preceding branch and then replays all instructions up to the excepting instruction.

SMT Register File Designs

In the SMT, the register file holds the state of multiple thread contexts. Because threads only access registers from their own context, any of the following four preferred embodiments of the present invention might be used for distributing renaming registers among the contexts of the threads. As described below and as illustrated in FIGS. 5A–5D, register resource 37 (FIG. 1) has a markedly different configuration for each of the four preferred embodiments.

1. Private Architectural and Private Renaming (PAPR) registers (shown in a block diagram 80 in FIG. 5A): In this preferred embodiment, the architectural and renaming registers are physically partitioned among the contexts; each context has its own registers, and each thread only accesses registers from its own context. Thus, a first thread has a set 86 of architecturally specified registers and employs a set 82 of renaming registers, none of which are available for use by any other thread, while a second thread has a set 88 of architecturally specified registers and employs a set 84 of renaming registers, none of which are available for use by any other thread. An advantage of (PAPR) stems from the lower access times of each private register file. The architectural registers and renaming registers in each set provided a thread are only available to service a contexts for that thread. Thus, even though the architectural registers and renaming registers for the third and fourth threads are currently not in use in contexts for those threads, their architectural registers and renaming registers are not available for use by contexts in any other threads.

2. Private Architectural and Shared Renaming (PASR) registers (shown in a block diagram 90 in FIG. 5B): More flexibility can be gained over the PAPR approach by employing the second preferred embodiment of the present invention. In this embodiment, the renaming registers comprising the registers resource are shared across all contexts for all threads. As shown in this example, one or more renaming registers 85 are assigned to the context for the first thread, while one or more renaming registers 87 are assigned to the context for the second thread. By sharing the renaming registers, the PASR scheme exploits variations in register requirements for the threads, thereby providing better utilization of the renaming registers.

Figure 5A:
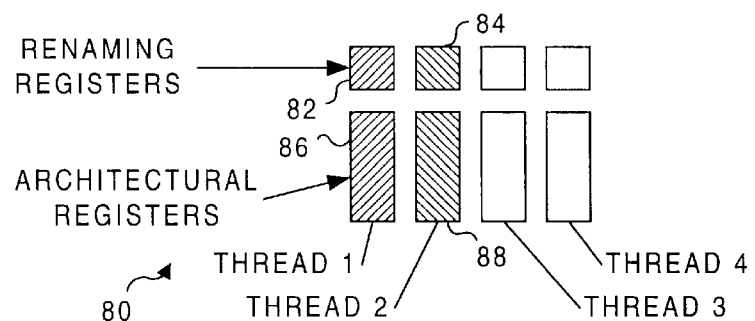
FIGS. 5A–5D are block diagrams illustrating logical register file configurations for private architectural and private renaming (PAPR) registers, private architectural and shared renaming (PASR) registers, semi-shared architectural and shared renaming (SSASR) registers, and fully shared registers (FSR), respectively.
Figure 5B:
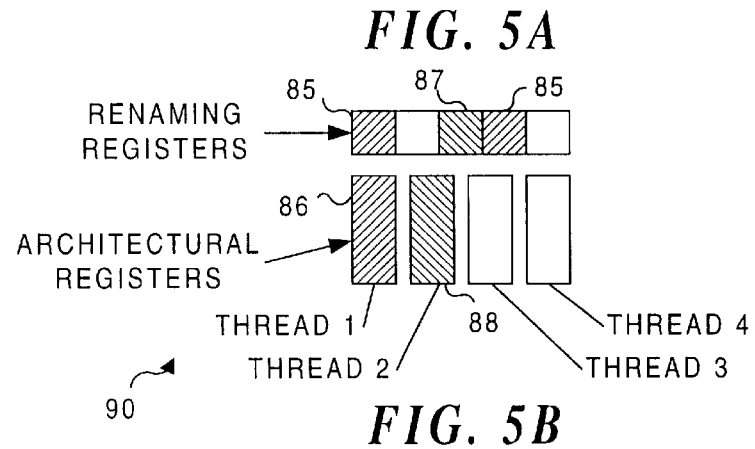
Figure 5C:
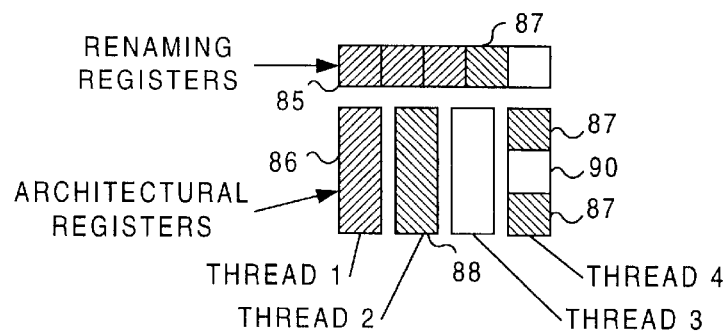
Figure 5D:
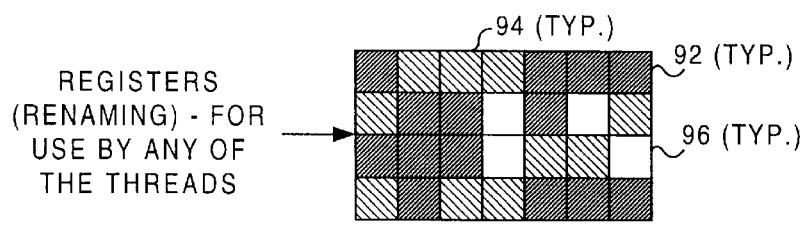
Figure 6A:
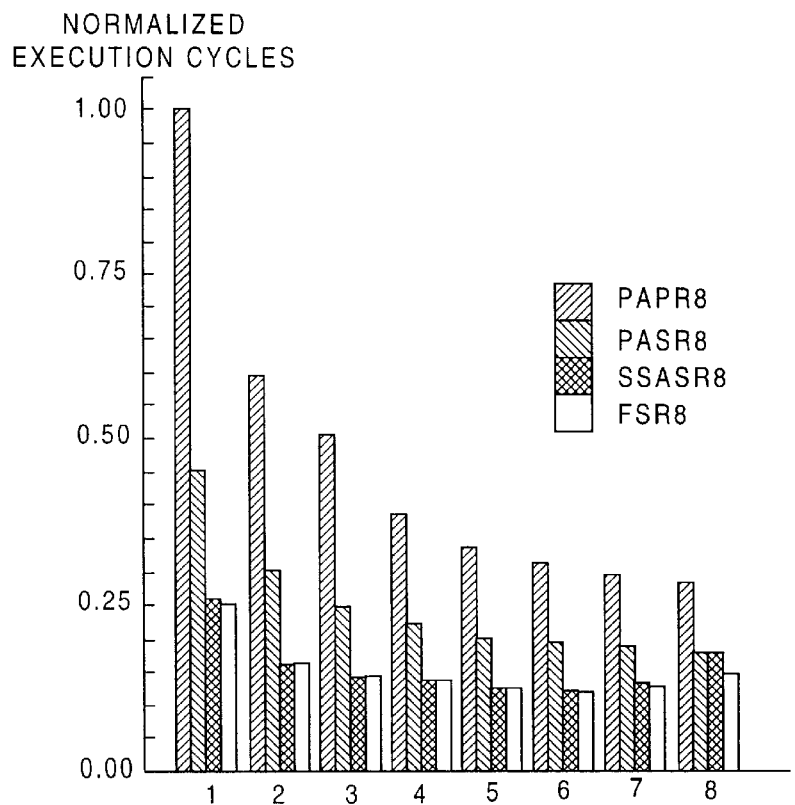
FIGS. 6A–6D are graphs showing the number of normalized executions cycles for the four register file configurations noted in FIGS. 5A–5D, for register file sizes of 264, 272, 288, and 352 registers, respectively.
Figure 6B:
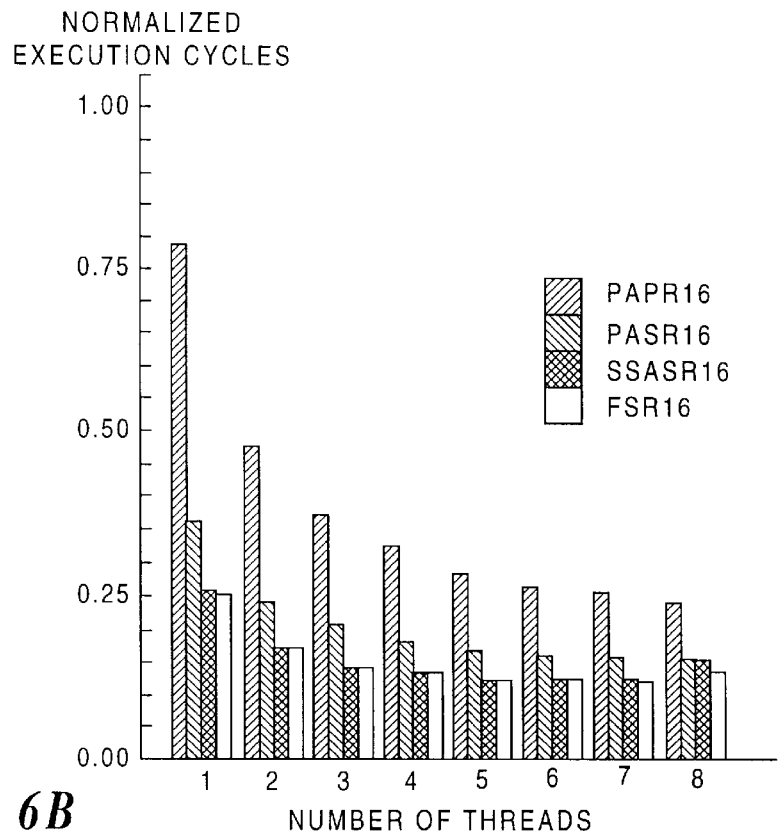
Figure 6C:
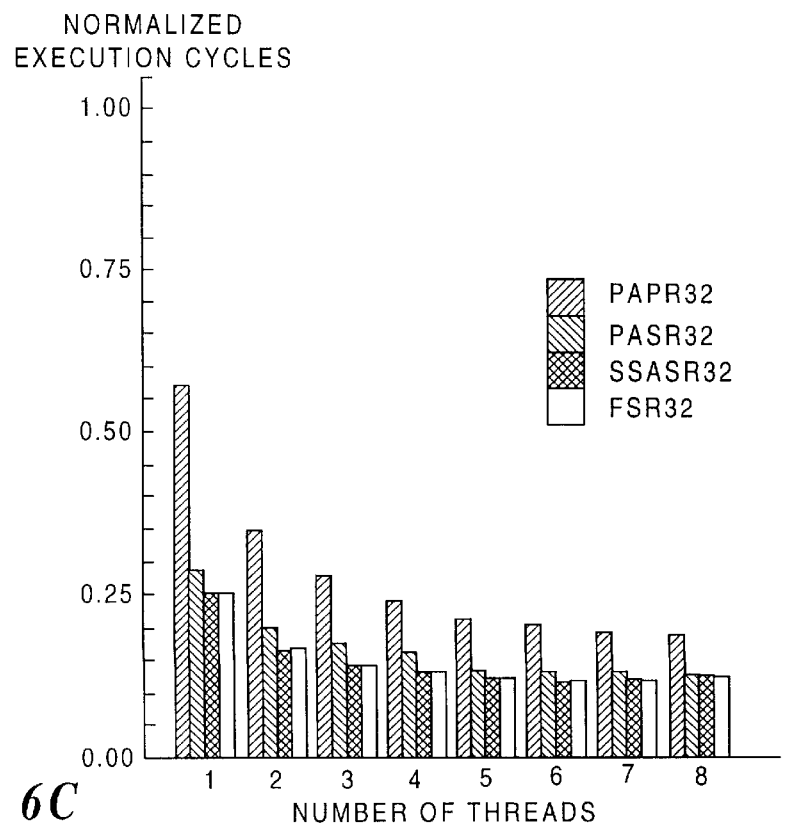
Figure 6D:
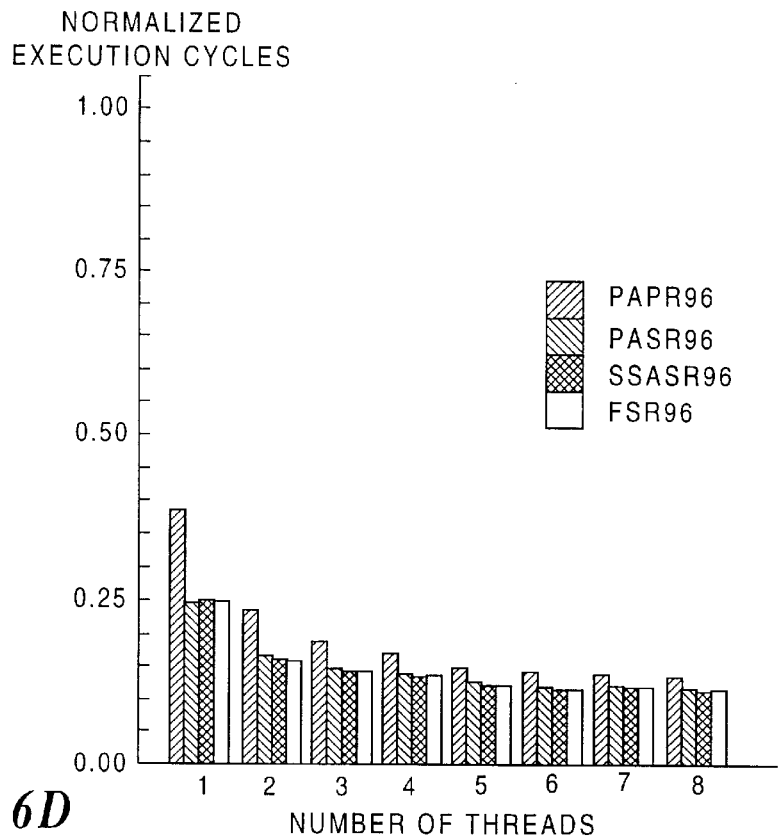

3. Semi-Shared Architectural and Shared Renaming (SSASR) registers (shown in FIG. 5C): This register resource configuration scheme, which is the basis for the third preferred embodiment of the present invention, is based on the observation that a parallel program might execute on an SMT with fewer threads than the number of hardware contexts. In this situation, the architectural registers for the idle hardware contexts might go unused. In the SSASR scheme, architectural registers 90 of idle contexts are usable as renaming registers for any loaded contexts, e.g., they may be used as renaming registers 87 for the context of the first thread as shown in FIG. 5C. The SSASR scheme requires additional operating system and/or runtime system support to guarantee the availability of the idle architectural registers. For example, a parallel application might be running with only six threads, so that two idle contexts are available. If another application is started, register handler 28 must allow the new thread to reclaim its architectural registers (which have been used as renaming registers by the first application). Despite this requirement, the scheme is attractive because it enables higher utilization of the architectural registers, and it opens the possibility of achieving better performance with fewer threads, each using more registers.

4. Fully Shared Registers (FSR) (shown in FIG. 5D): This final approach is the most flexible embodiment of the present invention. In FSR, the entire register file or resource is managed as a single pool of registers, i.e., any available register 96 can be allocated for use as a renaming register 92 for used in the context of any thread, or can be allocated as a renaming register 94 for use by the context of any other thread, as required. FSR is essentially an extension of the register mapping scheme to multiple threads, employing a register resource in which no register is private to any context of any thread.

PAPR could be implemented in processors that rely on either reorder buffers or register mapping for register renaming. PASR and SSASR are more appropriate for processors that employ reorder buffers. FSR requires a register mapping scheme, but might actually prove to be less complex than PASR and SSASR, because a separate mapping table could be kept for each context (for per-context retirement), and all registers can be used equally by all threads.

Simulation Methodology

To evaluate these various register resource configurations (as well as the other aspects of the SMT reported herein), applications from the SPEC 92, SPEC 95 and SPLASH-2 benchmark suites were used. For the two SPEC benchmarks, the Stanford University Intermediate Format (SUIF) compiler was used to parallelize the applications; the SPLASH-2 programs were explicitly parallelized by the programmer. The primary focus was directed to parallel applications for two reasons. First, the threads of parallel programs tend to demand registers of the same type (integer or floating point) at the same time, so pressure on the physical registers can be greater than for independent sequential programs. Second, parallel applications can leverage SMT's multiple hardware contexts to potentially improve single-program performance. Specifically, in the SSASR and FSR schemes, reducing the number of threads allocated to the application increases the number of registers available per remaining thread. The tests discussed below evaluate the optimal thread/register trade-off for these applications.

For all programs in the evaluation workload, the Multiflow™ trace scheduling compiler was used to generate Digital Equipment Corporation Alpha™ object files. This compiler generates high-quality code, using aggressive static scheduling for wide issue, loop unrolling, and other instruction level parallelism (ILP)-exposing optimizations. These object files are linked with modified versions of the Argonne National Laboratories (ANL) and SUIF runtime libraries to create executable files.

The SMT simulator employed in these evaluations processes unmodified Alpha™ executable files and uses emulation-based, instruction-level simulation to model in detail the processor pipelines, hardware support for out-of-order execution, and the entire memory hierarchy, including TLB usage. The memory hierarchy in the simulated processor includes three levels of cache, with sizes, latencies, and bandwidth characteristics, as shown in Table 1. The cache behavior, as well as the contention at the L1 banks, L2 banks, L1–L2 bus, and L3 bank are modeled. For branch prediction, a 256-entry, four-way set associative branch target buffer and a 2 K×2-bit pattern history table are used.

TABLE 1

SMT memory hierarchy

|  | L1 I-cache | L1 D-cache | L2 cache | L3 cache |
| --- | --- | --- | --- | --- |
| Size | 32KB | 32KB | 256KB | 8MB |
| Associativity | direct-mapped | direct-mapped | 4-way | direct-mapped |
| Line size (bytes) | 64 | 64 | 64 | 64 |
| Banks | 8 | 8 | 8 | 1 |
| Transfer time/bank | 1 cycle | 1 cycle | 1 cycle | 4 cycle |
| Accesses/cycle | 2 | 4 | 1 | ¼ |
| Cache fill time(cycles) | 2 | 2 | 2 | 8 |
| Latency to next level | 6 | 6 | 12 | 62 |

Because of the length of the simulations, the detailed simulation results were limited to the parallel computation portion of the applications (which is the norm for simulating parallel applications). For the initialization phases of the applications, a fast simulation mode was used, which only simulates the caches, so that they were warm when the main computation phases were reached. A detailed simulation mode was then turned on for this portion of program execution. For some applications, the number of iterations were reduced, but the data set size was kept constant to ensure realistic memory system behavior.

Register File Design Experimental Results

In this section, the performance of the four register file configurations described above was evaluated. For each of the four configurations, the evaluation began with a total register file size of 256 architectural registers (eight 32-register contexts), plus 96 renaming registers, or 352 physical registers total. (The SMT originally had 356 registers, including: eight contexts* 32 registers/context+ 100 renaming registers. A total size of 256+96 registers was used in these experiments, because it is easier to divide among eight contexts.) To determine the sensitivity of these schemes to register file size, three register files that have fewer renaming registers were also studied, i.e., eight (264 registers total), 16 (272 registers total), and 32 (288 registers total). Table 2 describes each of these configurations.

TABLE 2

Description of register file configurations used in this study

| Configuration | Total physical registers | Architectural registers | Renaming registers |
| --- | --- | --- | --- |
| PAPR8 | 264 | 32/context | 1/context |
| PASR8 | 264 | 32/context | 8 |
| SSASR8 | 264 | 32/context | 8 |
| FSR8 | 264 | — | 264 |
| PAPR16 | 272 | 32/context | 2/context |
| PASR16 | 272 | 32/context | 16 |
| SSASR16 | 272 | 32/context | 16 |
| FSR16 | 272 | — | 272 |
| PAPR32 | 288 | 32/context | 4/context |
| PASR32 | 288 | 32/context | 32 |
| SSASR32 | 288 | 32/context | 32 |
| F5R32 | 288 | — | 288 |
| PAPR96 | 352 | 32/context | 12/context |
| PASR96 | 352 | 32/context | 96 |
| SSASR96 | 352 | 32/context | 96 |
| F5R96 | 352 | — | 352 |

For PAPR, PASR, and SSASR, the naming convention used above identifies how many additional registers are provided for renaming, beyond the required 256 architectural registers. For example, PAPR8 has 256+8=264 registers. For FSR, all registers are available for renaming, so the configuration number simply indicates the number of additional registers above the 256 architectural registers, to comply with the naming of the other schemes. Thus, FSR96 and PAPR96 both have 352 registers in their INT and FP register files.

Register availability is critical to good performance, because instruction fetching can stall when all renaming registers have been allocated. Table 3 shows the average frequency of instruction fetch stalls in the application of the present invention for the four configurations, each with four register file sizes, and for a varying number of threads. Overall, the data indicate that the lack of registers is a bottleneck for smaller register file sizes, and the more rigidly partitioned register file schemes. For a fixed register file size and a fixed number of threads, the more flexible schemes are able to put the shared registers to good use, reducing the frequency of fetch stalls. In fact, for both SSASR and FSR, the register file ceases to be a bottleneck for smaller numbers of threads. For all register configurations, increasing the number of physical registers usually decreases stalls.

The sensitivity of instruction fetch stalling to the number of executing threads depends on the register configuration. PAPR has a fixed number of registers available to each thread, regardless of the number of threads; adding threads simply activates idle register contexts. Therefore, PAPR's stall frequency is fairly uniform across different numbers of threads. At eight threads (the maximum), stalling actually drops; eight threads provides the greatest choice of instructions to issue, and the resulting better register turnover translates into few stalls. The other schemes restrict the number of registers per thread as more threads are used, and their results reflect the additional register competition. For SSASR and FSR, which make both renaming and architectural registers available to all threads, serious stalling only occurs with the maximum number of threads.

TABLE 3

Percentage of total execution cycles with fetch stalls because no renaming registers are available.

| Configuration | Integer Registers | | | | Floating Point (EP) Registers | | | |
|---|---|---|---|---|---|---|---|---|
| | Number of Threads | | | | | | | |
| | 1 | 2 | 4 | 8 | 1 | 2 | 4 | 8 |
| PAPR8 | 54.7 | 58.0 | 58.6 | 57.2 | 38.8 | 36.6 | 33.1 | 27.6 |
| PASR8 | 50.3 | 54.3 | 56.0 | 53.5 | 40.4 | 37.6 | 32.7 | 25.5 |
| SSASR8 | 42.2 | 46.3 | 47.3 | 43.1 | 43.6 | 40.2 | 33.3 | 23.0 |
| FSR8 | 28.2 | 31.6 | 27.8 | 24.7 | 42.6 | 40.1 | 26.2 | 15.0 |
| PAPR16 | 36.0 | 38.9 | 44.9 | 43.1 | 42.2 | 35.3 | 32.0 | 21.3 |
| PASR16 | 25.2 | 30.8 | 32.9 | 34.2 | 41.4 | 41.6 | 31.9 | 17.0 |
| SSASR16 | 11.8 | 21.1 | 21.5 | 23.7 | 41.7 | 42.1 | 29.0 | 11.9 |
| FSR16 | 0.0 | 4.9 | 3.4 | 7.9 | 2.0 | 25.7 | 19.8 | 9.0 |
| PAPR32 | 0.0 | 0.0 | 1.8 | 43.2 | 0.0 | 0.0 | 8.0 | 21.3 |
| PASR32 | 0.0 | 0.0 | 1.6 | 34.1 | 0.0 | 0.0 | 4.2 | 17.0 |
| SSASR32 | 0.0 | 0.0 | 1.3 | 23.2 | 0.0 | 0.0 | 5.0 | 12.1 |
| FSR32 | 0.0 | 0.0 | 0.7 | 7.9 | 0.0 | 0.0 | 0.3 | 9.0 |
| PAPR96 | 0.0 | 0.0 | 1.8 | 32.5 | 0.0 | 0.0 | 7.9 | 14.9 |
| PASR96 | 0.0 | 0.0 | 1.6 | 27.1 | 0.0 | 0.0 | 6.9 | 12.6 |
| SSASR96 | 0.0 | 0.0 | 1.3 | 20.1 | 0.0 | 0.0 | 5.1 | 9.5 |
| FSR96 | 0.0 | 0.0 | 0.7 | 7.6 | 0.0 | 0.0 | 0.3 | 8.8 |

Variations in the results between the two types of registers (INT and FP) can be attributed to different data type usage in the applications. Although the programs tend to be FP intensive, DNT values have longer lifetimes.

The stall frequency data shown in Table 3 is useful for understanding the extent of the register bottleneck, but not its performance impact. The performance effect of the options studied is illustrated in the graphs of FIGS. 6A–6D, which show total execution cycles (normalized to PAPR8 with 1 thread) for the workload. Each graph compares the four register organization schemes for a different total register file size, i.e., 264 registers, 272 registers, 288 registers, and 352 registers.

From FIGS. 6A–6D, it will be apparent that the more restrictive schemes, PAPR and RASR, are always at a disadvantage relative to the more flexible schemes, SSASR and FSR; however, that disadvantage decreases as the register file size increases. Thus, if large register files are an option, the more restrictive schemes may be used with satisfactory performance. If a smaller register file size is a crucial goal, the shared-register schemes can be used to obtain "large register file performance." For example, with eight threads, the performance of FSR16, with 272 total registers, matches that of PAPR96 with 352 registers.

It is interesting to note that a shared-register scheme, such as FSR, addresses a concern about multithreaded architectures, namely, their (possibly reduced) performance when only a single thread is executing. Because FSR can concentrate all of its register resources on a solitary thread, when only one thread is running, FSR8 shows a 400% speedup when compared to PAPR8.

FIGS. 7A–7D plot the same data, but each graph shows the effect of changing register file size for a single register organization scheme. From these FIGURES, it will be evident that the addition of registers has a much greater impact for the more restrictive schemes than for the flexible schemes. More important, it will be noted that for SSASR and FSR, performance is relatively independent of the total number of registers, i.e., the bars for FSR8 and FSR96 are very similar. For less than eight executing threads, FSR8 and FSR96 differ by less than 10%.

Figure 7A:
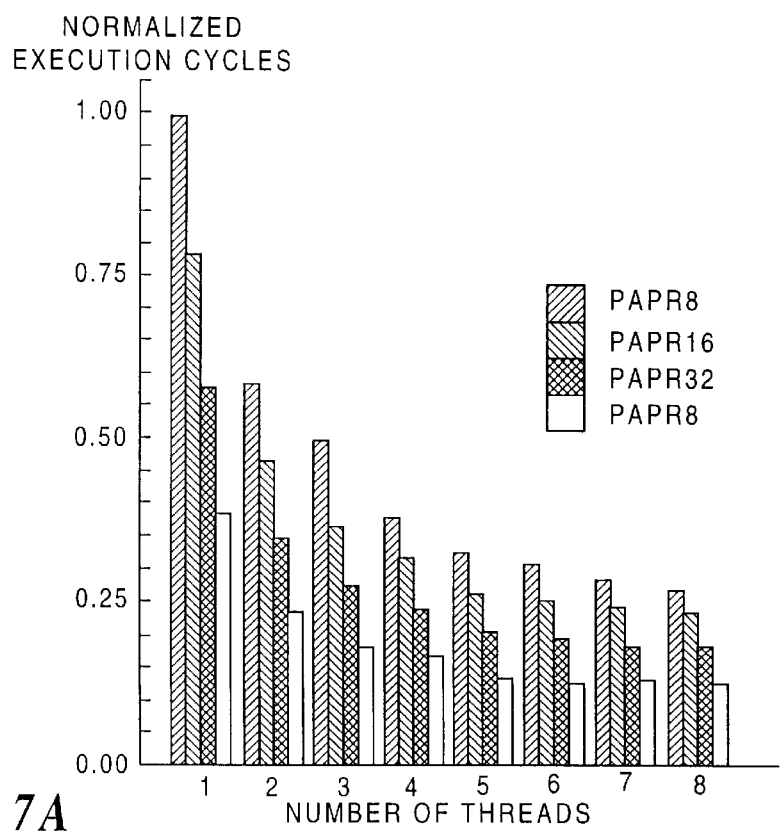
FIGS. 7A–7D are graphs showing the number of normalized executions cycles for each of the four register file configurations noted in FIGS. 5A–5D, respectively, as the size of the register file is increased from one to eight threads.
Figure 7B:
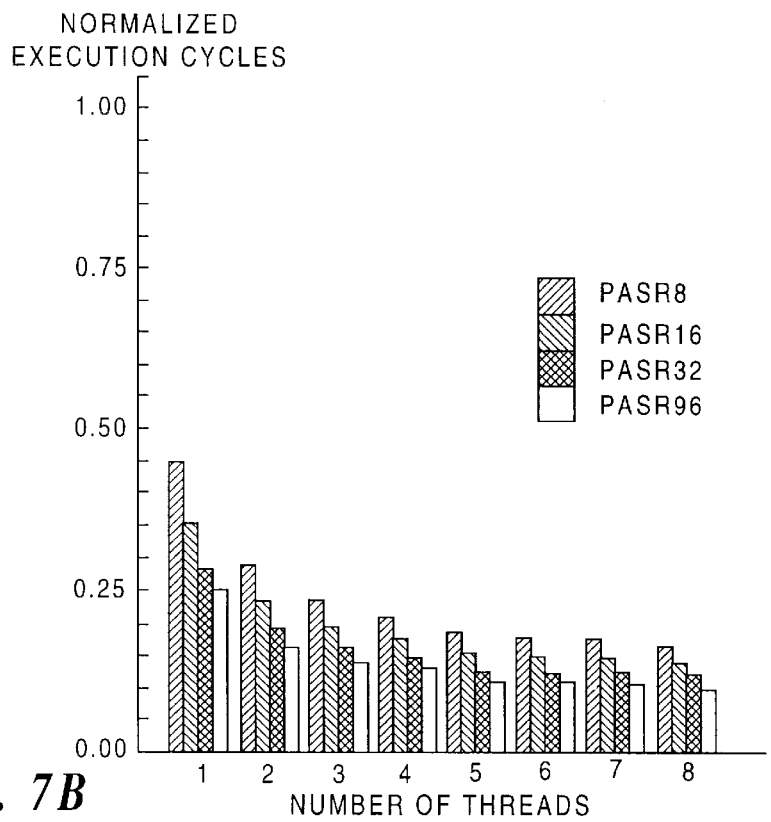
Figure 7C:
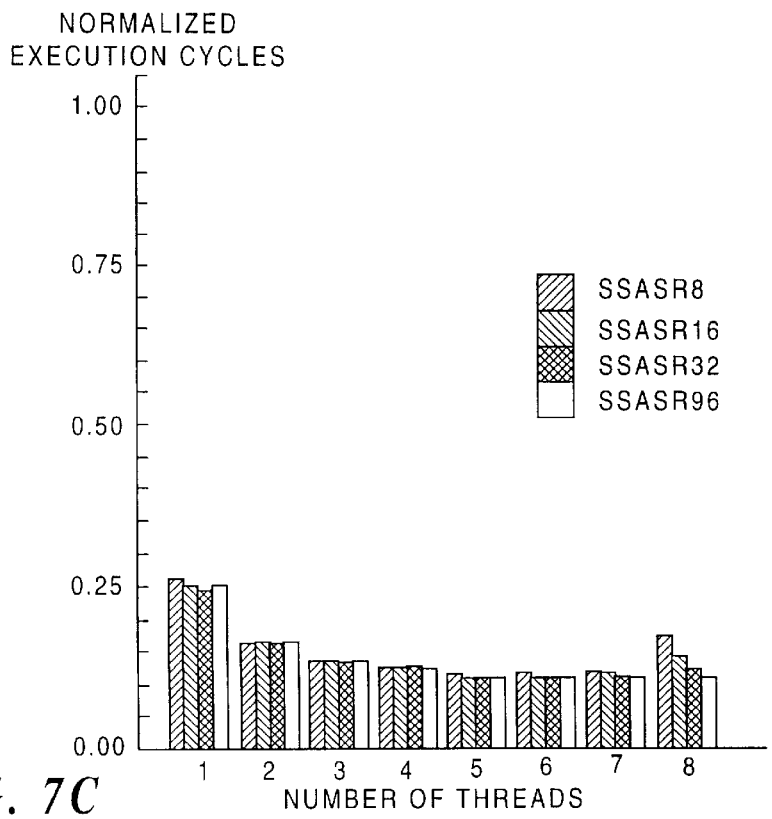
Figure 7D:
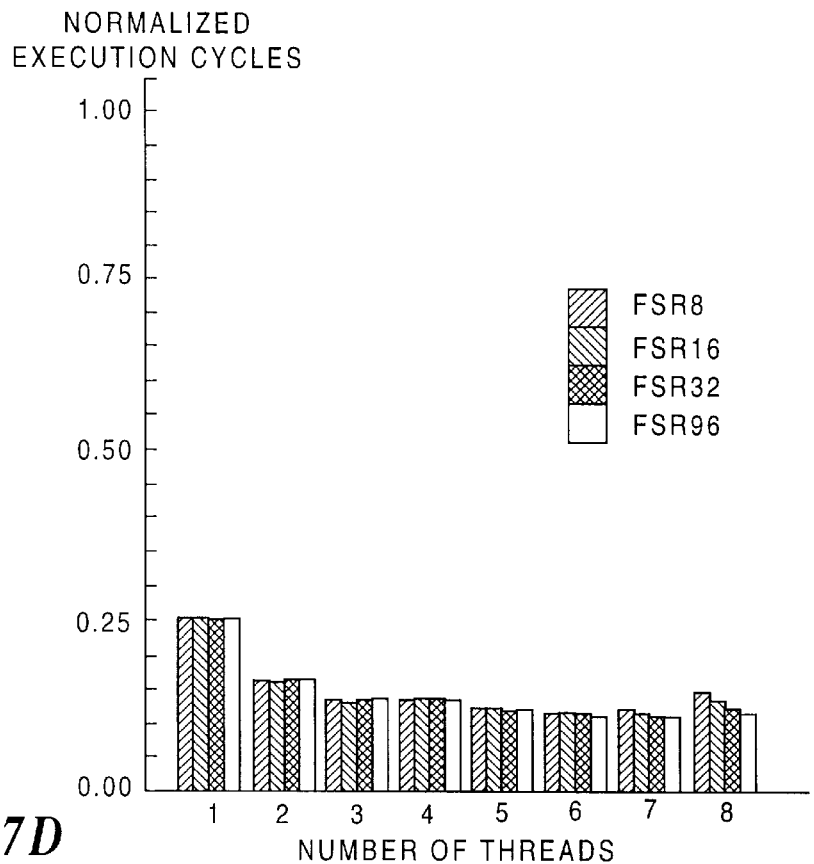
Figure 8:
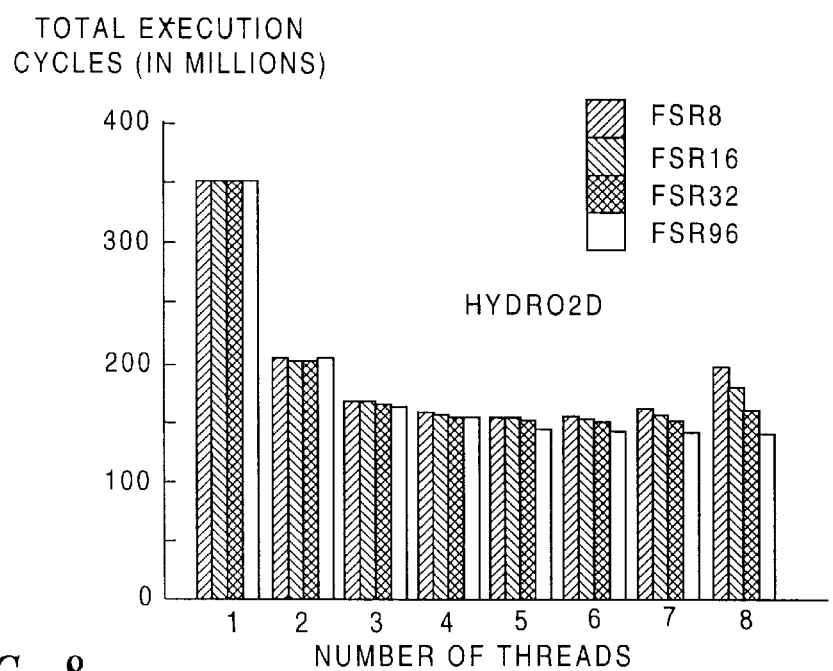
FIG. 8 is a graph illustrating the total number of execution cycles for the hydro2d benchmark, for FSR8, FSR16, FSR32, and FSR96, as the size of the register file is increased from one to eight threads.

Finally, FIGS. 7C–7D indicate that for FSR and SSASR, some applications attain their best performance with fewer than eight threads. For the register-sharing schemes, reducing the number of threads increases the number of registers available to each thread. For register-intensive applications, such as "hydro2d" (shown in FIG. 8), better speedup is achieved by additional per-thread registers, rather than increased thread-level parallelism. There are three primary reasons for this result. First, some applications have high utilization with five threads (e.g., 5.6 instructions per cycle for LU). Thus, further improvement with additional threads can only be marginal. Second, increased memory contention can degrade performance with more threads (e.g., adding threads in "swim" increases LI cache bank conflicts). Third, the poor speedup of some programs, such as "vpe," is due to long memory latencies; adding more threads decreases the average number of physical registers available to each thread, limiting each thread's ability to expose sufficient parallelism to hide memory latency.

In summary, the ratio of physical to architectural registers on modern processors, such as the MIPS R10000™ and Digital Equipment Corporation's Alpha 21264™, is often greater than two-to-one. With flexible sharing of registers, an SMT processor can maintain good performance and support for multiple threads, while keeping the number of physical registers nearly equivalent to the number of architectural registers (e.g., 264 vs. 256 for FSR8), and deliver enhanced performance to a solitary thread by making registers in unused contexts available to that thread.

Register File Access Time And Implementation Trade-Offs

The access time to a large, multi-ported register file can be a concern when building processors with high clock rates. Although it is difficult to determine precise cycle times without actually implementing the processor, ballpark estimates can be obtained with a timing model. The intent of this section is to illustrate the trade-offs between cycle time and implementation complexity for the four SMT register file designs.

Farkas, Jouppi, and Chow's register file timing model was used to determine the access times reported and was extended for use with a 0.35 $\mu$m process device. The model is useful for obtaining relative access times and approximate performance slopes, rather than accurate absolute values. For example, the recently-announced Digital Equipment Corporation Alpha™ 21264 INT register file has 80-INT registers, with four read ports and four write ports. According to the model, the access time for such a register file is 2.5 ns, while the 21264 is intended to run at a minimum of 500 MHz (a 2 ns cycle time). Nonetheless, the model is suitable for providing insights into cycle time trade-offs for various register file configurations.

Although the four register file designs contain 264, 272, 288, and 352 total physical registers, the actual implementation of these schemes may not require monolithic register files that large. With reorder buffers, the architectural and renaming registers are split, so that register access time is limited by the larger of the two. Mapping tables, on the other hand, have a single pool of physical registers that must be accessed. For each of the four SMT register files, there are a variety of implementations and therefore, cycle times.

PAPR: Because each thread has its own private register set, the contexts could be implemented as eight separate, and therefore, smaller register files, using either reorder buffers or mapping tables. According to the model, assuming SMT's 12 read ports and 6 write ports, the access times of the register files range from 2.6 ns to 3.0 ns, depending on the number of renaming registers. This contrasts with 3.8 ns access time required for a single register file with 352 registers. However, because of the full connectivity between SMT functional units and register contexts, an additional level of logic (a multiplexor) would slightly extend the smaller access time.

PASR: Register file access is limited by the 2.6 ns access time of the 32 architectural registers for PASR8, PASR16, and PASR32, since the pool of renaming registers is smaller. For PASR96, the 96-register renaming pool determines the access time (3.0 ns).

SSASR: Although active contexts have a private set of architectural registers, the registers of idle contexts must be accessible. One implementation consists of eight separate architectural register files and one renaming register file. When a thread needs a register, it selects between its architectural register set, the renaming registers, and the registers of an idle context. The access time to the individual register files is 2.6 ns for SSASR8, SSASR16, or SSASR32, and 3.0 for SSASR96, plus a slight additional delay for the selection mechanism. An alternative implementation could use a single register file, and therefore require cycle times of 3.6 ns (SSASR8, SSASR16, and SSASR32), and 3.8 ns (SSASR96).

FSR: The register mapping scheme can be extended to multiple threads to implement FSR. Each thread has its own mapping table, but all threads map to the same pool of registers; therefore, access time is that of a single monolithic register file (the access times of the second SSASR implementation).

Although the register file size can have a big impact on its access time, the number of ports is the more significant factor. Limiting the connectivity between the functional units and the register file would reduce the number of ports; there are two other alternatives, as described below.

One approach replicates the register file, as in the 21264, trading off chip real estate for cycle time improvement. In this design, half of the functional units read from one register file, while the remaining units read the other; hence each requires half the number of read ports. All functional units write to both register files to keep their contents consistent. As an example, by cutting the number of read ports in half to six, the access time for FSR96 would be reduced by 12% (from 3.8 ns to 3.4 ns).

A second approach reduces the number of ports by decreasing the number of functional units. Here the tradeoff is between cycle time and instruction throughput. As an example, the access times for a register resource having six integer FUs (12 read ports, six write ports) was compared with the access times for a register file having only four FUs (eight read ports, four write ports); the configuration with fewer FUs has access times 12% and 13% lower for register resource sizes 352 and 264, respectively. For programs, such as "vpe," in which performance is limited by factors other than the number of Fus (such as fetch bandwidth or memory latencies), the trade-off is a net win. Although "vpe" requires 1% more execution cycles with only four integer FUs, total execution time is reduced because of the lower cycle time. On the other hand, in INT-unit-intensive applications like lower-upper decomposition (LU), total execution time increases with fewer integer units, because the 25% increase in total cycles dwarfs the cycle time improvements. LU illustrates that when sufficient instruction-level and thread-level parallelism exist, the throughput gains of wider machines can overcome the access time penalties of register files with more ports. The model and the experimental measurements described in this section are only meant to provide guidelines for SMT register file design. Ultimately, register file access times will be determined by the ability of chip designers to tune register file designs.

Exposing Register Deallocation to the Software—Motivation

In the previous sections, register renaming was discussed in the context of allocating physical registers to remove false dependencies. The renaming hardware is also responsible for freeing registers, i.e., invalidating mappings between architectural and physical registers. Most out-of-order processors provide speculative execution and precise interrupts. In order to preserve correct program behavior in the face of exceptions and branch mispredictions, dynamically-scheduled instructions must be retired in program order. In-order instruction retirement involves deallocating physical registers, also in program order. When a register is deallocated, its contents may be overwritten. Consequently, a physical register can only be freed when the hardware can guarantee that the register's value is "dead," i.e., its contents will not be used again, as illustrated in FIG. 10. In this Figure, Instruction 1 defines r20, creating a mapping to a physical register, e.g., P1. Instruction 3 is the last use of r20. P1 cannot be freed until r20 is redefined in instruction 6. In this example, several instructions and potentially, a large number of cycles can pass between the last use of P1 (r20) and its deallocation. This register waste illustrates the inability of the hardware to efficiently manage physical registers. Because the hardware cannot tell if a particular register value will be reused in the future, it conservatively deallocates only when the architectural register is redefined.

In contrast, a compiler can identify the last use of a register value. However, current processors lack mechanisms to communicate this information to the hardware. In this section, several mechanisms that expose register deallocation to the compiler are proposed and evaluated, showing that they permit more efficient use of the registers.

First, it is helpful to note the experimental justification for the techniques. For several programs in the workload, the lifetimes of register values were tracked, and the wasted cycles in each lifetime were determined. Specifically, the number of instructions and cycles between the last use of a register value and the cycle in which the register was freed were counted (called the "dead register distance"). Table 4 shows the number of cycles and instructions averaged over all register values for four different register file sizes for FSR. Instructions that use and redefine the same register contribute no waste cycles. The data illustrates that a large number of cycles often passes between the last use of a register value and the cycle in which the register is freed. The previous section in this disclosure showed that smaller register files stall more frequently, because no renaming registers are available. Table 4 suggests that more efficient register deallocation could prove beneficial to addressing the register shortage.

Three Solutions

The dead register distance can be reduced by using the compiler to identify the last use of a register value through data flow analysis. Also needed is a mechanism to communicate this information to the hardware, such as the following three alternatives:

- Free Register is an instruction that specifies one or two registers to be freed and is generated after each last use of a register (if the register is not also redefined).
- Free Mask is an instruction that can free multiple registers over larger instruction sequences. The dead registers are identified at the end of each scheduling block (with the Multiflow compiler, this is a series of basic blocks called a trace). Rather than using a single instruction to free each dead register, a bit mask is generated that specifies them all. In this particular implementation, the Free Mask instruction uses the lower 32-bits of a register as a mask to indicate the registers that can be deallocated. The mask is generated and loaded into the register using a pair of lda and ldah instructions, each of which has a 16-bit immediate field. The examples shown in FIGS 11B–11C compare Free Register with Free Mask relative to the base, for a code fragment that frees integer registers 12, 20, 21, 22, 23, and 29. FIG. 11C shows the Free Mask instructions (fml) necessary to free the same registers.
- The third scheme, Free Register Bit, identifies the same last use information as Free Register, but communicates the information via dedicated instruction bits, rather than extra instructions.

For all three techniques, the underlying hardware support is very similar. In current register renaming schemes, physical registers are deallocated during the commit phase of the pipeline; similarly, when one of these instructions (Free Register, Free Mask, or instruction with Free Register Bits set) commits, the dead physical registers are deallocated and added back to the free register list, and the corresponding logical-to-physical register mappings are invalidated, if necessary.

TABLE 4

Dead register distance for 8 threads.

| | Dead Register Distance | | | | | | | |
|---|---|---|---|---|---|---|---|---|
| | avg cy-cles | avg inst | avg cy-cles | avg inst | avg cy-cles | avg inst | avg cycles | avg inst |
| Benchmark | FSR8 | | FSR16 | | FSR32 | | FSR96 | |
| cho | 47.4 | 14.7 | 41.4 | 14.7 | 36.0 | 14.6 | 32.3 | 14.5 |
| hydro2d | 93.6 | 39.4 | 86.7 | 39.5 | 79.9 | 39.6 | 74.6 | 39.5 |
| mgrid | 21.8 | 11.7 | 21.5 | 11.7 | 21.4 | 11.7 | 21.4 | 11.7 |
| mxm | 60.6 | 14.6 | 45.3 | 14.7 | 36.9 | 15.0 | 35.2 | 15.9 |
| swim | 84.8 | 30.1 | 81.7 | 30.4 | 92.6 | 31.0 | 83.4 | 31.2 |
| tomcatv | 100.8 | 20.0 | 79.2 | 19.9 | 61.1 | 20.0 | 47.1 | 19.9 |
| vpe | 196.2 | 26.2 | 195.5 | 26.7 | 195.0 | 27.7 | 219.6 | 30.2 |

Free Register Results

Since FSR is the most efficient of the four register file schemes, it is used as a baseline for evaluating the benefits of the register free mechanisms; the examination begins with the smallest FSR configuration (FSR8), since it suffered the most fetch stalls. Table 5 indicates that Free Register reduces the number of fetch stalls caused by insufficient registers by an average of 8% (integer) and 4% (FP). However, the reductions come at the price of an increase in dynamic instruction count, reaching nearly 50% for some applications. The net result is that for most programs, Free Register actually degrades performance, as shown in the comparisons of FIGS. 12A–12G, where the two leftmost bars for each benchmark compare total execution cycles for FSR8 with and without Free Register. These results indicate that, while there may be some potential for program speedups with better physical register management, Free Register's overhead negates any possible gains.

Free Mask Results

The Free Mask scheme attempts to lower Free Register's instruction overhead by reducing the number of register deallocation instructions. As shown in Table 5, the Free Mask scheme requires a more modest increase in instruction count, while still reducing the number of fetch stalls. Notice that there is one anomalous result with "swim," where integer register fetch stalls decrease, but FP register fetch stalls increase, both substantially. With a small register file, "swim" has insufficient integer registers to load all array addresses and therefore frequently stalls. With a larger register file (or more efficient use of registers with Free Mask), this bottleneck is removed, only to expose the program's true bottleneck a large FP register requirement.

TABLE 5

Program execution characteristics (FSR8, 8 threads).

| | Base | | | Free Register | | | Free Mark | | |
|---|---|---|---|---|---|---|---|---|---|
| Benchmark | useful insts executed (millions) | fetch stalls because no free int regs | fetch stalls because no free FP regs | useful insts executed (millions) | fetch stalls because no free int regs | fetch stalls because no free FP regs | useful insts executed (millions) | fetch stalls because no free int regs | fetch stalls because no free FP regs |
| cho | 62.3 | 69.2% | 0.0% | 81.4 | 54.9% | 0.0% | 67.9 | 57.8% | 0.0% |
| hydro2d | 666.5 | 15.1% | 41.2% | 879.2 | 12.9% | 27.4% | | | |
| mgrid | 423.1 | 5.1% | 0.2% | 597.5 | 2.4% | 0.0% | | | |
| maximum | 72.1 | 64.0% | 0.3% | 111.2 | 50.9% | 0.1% | 76.4 | 46.7% | 0.1% |
| swim | 431.4 | 52.7% | 8.2% | 626.1 | 36.4% | 3.9% | 464.9 | 3.2% | 26.0% |
| tomcatv | 437.3 | 3.1% | 90.5% | 632.4 | 3.5% | 83.5% | | | |
| vpe | 22.5 | 78.8% | 2.6% | 32.1 | 69.5% | 1.2% | 23.3 | 0.5% | 1.9% |

In terms of total execution cycles, Free Mask outperforms Free Register and FSR8 base. For some applications, Free Mask is not as effective as Free Register in reducing fetch stalls, but, because of its lower overhead, it reduces total execution cycles.

TABLE 6

Average dead register distances and percentage increase in instructions executed relative to FSR8.

| FSR8 | | Free Register FSR8 | | | Free Mask FSR8 | | | Free Register Bit FSR8 | | | FSR96 | | |
|---|---|---|---|---|---|---|---|---|---|---|---|---|---|
| Dead register distance | | Dead register distance | | Insts executed | Dead register distance | | Insts executed | Dead register distance | | Insts executed | Dead register distance | | Insts executed (% |
| avg cycles | avg insts | avg cycles | avg insts | (% increase vs FSR8) | avg cycles | avg insts | (% increase vs. FSR8) | avg cycles | avg insts | (% increase vs. FSR8) | avg cycles | avg insts | increase vs FSR8) |
| 86.5 | 22.4 | 90.6 | 31.0 | 42% | 35.7 | 6.4 | 7% | 20.6 | 4.7 | 0% | 73.4 | 20.6 | 0% |

Encoding Last Use Information in the ISA

Although Free Mask was able to improve performance for several applications, its more infrequent use over a larger program space somewhat limits its ability to deallocate registers expediently. Free Register Bit addresses this drawback, as well as the instruction overhead of Free Register. Free Register Bit uses two dedicated instruction bits for encoding last use information directly into the instructions. Consequently, it avoids the instruction cost of Free Register, without sacrificing fine-granularity register deallocation, as shown by the smaller average dead register distances in Table 6. For example, on average, Free Register Bit reduces the dead register distance by 420% (cycles) and 413% (instructions), with no additional instruction overhead relative to FSR8. Its improved register management outperforms the other three techniques, achieving average speedups of 92%, 103%, and 64% versus. FSR8, Free Register and Free Mask, respectively (FIGS. 12A–12G, rightmost bar).

When comparing Free Register Bit to all four FSR sizes, two performance characteristics are apparent (see the graphs in FIGS. 13A–13G). First, Free Register Bit is most advantageous for smaller register files (for example, it obtains a 64% speedup over FSR8), since registers are a non-limited resource in these cases. Larger register files see less benefit, because, for many applications, there are already sufficient registers and further speedups are limited by other processor resources, such as the size of the instruction queues. Second, Free Register Bit allows smaller register files to attain performance comparable to much larger register files, because it uses registers much more effectively. FIGS. 13A–13G illustrate that for several applications, Free Register Bit FSR8 outperforms FSR32 by 17%; when compared to FSR96, Free Register Bit FSR8 only lags by 2.5%. FSR96 attains better performance, simply because it has more registers; FSR96's waste distance is still very large, averaging 73.4 execution cycles and 20.6 instructions.

The primary drawback for this approach is that it requires dedicated instruction bits, as is also the case with other architectural mechanisms, such as software-set branch prediction bits. Using additional instruction bits for last uses may shave valuable bits off the immediate or branch offset fields. If the opcode bits prove difficult to retrofit into existing ISAs, the large potential for performance gains with more careful physical register deallocation justifies further investigation into alternative or more intelligent Free Register and Free Mask implementations. Two possibilities include: (1) omitting Free Register instructions if the registers are redefined within a few instructions, and (2) a hybrid Free Register/Free Mask scheme that reduces overhead, but without sacrificing granularity.

Applicability to Other Architectures

Although the benefits of the register freeing mechanisms have been examined in the context of an SMT processor, the techniques are applicable to other architectures as well. The SMT processor and register file models can be used to get an indication of how much single-threaded, dynamically-scheduled processors could benefit from these architectural mechanisms. FIGS. 14A–14G show the performance gain for Free Register Bit with various PAPR file sizes when only a single thread is running. For example, PAPR32 with one thread is equivalent to a wide-issue superscalar with 64 physical registers (32 private architectural+32 renaming). As with the eight thread FSR results, Free Register Bit has greatest benefit for smaller register files. In contrast to the FSR results, however, Free Register Bit continues to provide performance gains for larger register files. With only one thread supplying parallelism, more registers are required to expose program parallelism.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for assigning registers for use by a multi-threaded processor that is capable of concurrently executing instructions from a plurality of threads out-of-order, where each of the plurality of threads has a separate context and the plurality of threads can include threads running within a single application, threads running within different applications, and/or threads for different processes, comprising the steps of:
   (a) providing a plurality of registers for use by the processor in executing the plurality of threads, each register among the plurality of registers being allocable to be used as an architectural register and as a renaming register; and
   (b) dynamically allocating and assigning said plurality of registers to a thread being processed by the multithreaded processor, as required to support out-of-order execution of instructions for said thread.

2. The method of claim 1, wherein if a thread defines a new register value, a renaming register is dynamically allocated from any of the plurality of registers not currently in use by the processor, for a lifetime of said register value for said thread.

3. The method of claim 2, wherein after use of said register value is complete, said renaming register is made available for reallocation and assignment to any thread, including said thread to which said renaming register was previously allocated and assigned.

4. The method of claim 2, further comprising the step of mapping architectural registers referenced in the instructions to any of the plurality of registers that are available.

5. In a multithreaded processor that is capable of concurrently executing instructions out-of-order for a plurality threads, each thread having a separate context, a register resource comprising:
   (a) a plurality of registers, each of which may be used by any of said plurality of threads as an architectural register or a renaming register; and
   (b) a register handler that dynamically allocates and assigns architectural registers and renaming registers to a thread to enable execution of instructions out-of-order for that thread.

6. The register resource of claim 5, wherein if a thread defines a new register value, a renaming register is dynamically allocated by the register handler from any of the plurality of registers not currently in use by the processor, for a lifetime of said register value for said thread.

7. The register resource of claim 6, wherein after use of said register value is complete, said renaming register is made available to the register handler for reallocation and assignment to any thread, including said thread to which said renaming register was previously allocated and assigned.

8. The register resource of claim 6, wherein the register handler maps architectural registers referenced in the instructions to any of the plurality of registers that are available, for use as renaming registers.

9. A method for assigning registers for use by a multi-threaded processor that is capable of concurrently executing instructions from a plurality of threads out-of-order, where the plurality of threads can include threads running within a single application, threads running within different applications, and/or threads for different processes, said multithreaded processor providing a separate hardware context including a set of architectural registers for each thread up to a maximum number of threads that may be concurrently executed, and where at least one hardware context will be idle if less than the maximum number of threads is being concurrently executed, the method comprising the steps of:
   (a) providing a plurality of registers for use by the processor in executing the plurality of threads; and
   (b) dynamically allocating and assigning registers for use as renaming registers to a thread being processed by the multithreaded processor from a pool of registers that includes the plurality of registers provided in step (a) and any registers among a set of architectural registers that corresponds to an idle hardware context, as required to support out-of-order execution of instructions for said thread.

10. The method of claim 9, wherein the processor determines that the architectural register in a set is temporarily usable as a renaming register by executing an instruction that indicates said architectural register is not being used for a thread.

11. The method of claim 9, further comprising the step of enabling reassignment of all renaming registers that are assigned to registers among the set of architectural registers corresponding to the idle hardware context to new registers to free the idle hardware context so that it can be used to support execution of a new thread.

12. In a multithreaded processor that is capable of concurrently executing instructions out-of-order for a plurality of threads, a register resource comprising:
   (a) a plurality of registers including a portion of which are divided into sets of architectural registers, each set of architectural registers corresponding to a respective hardware context that supports execution of a separate thread by the multithreaded processor; and
   (b) a register handler that dynamically allocates and assigns registers among said plurality of registers as renaming registers as necessary to support out-of-order execution of the plurality of threads such that any of the architectural registers in a set that is currently not being used to support execution of a thread is temporarily usable as a renaming register.

13. The register resource of claim 12, wherein the processor determines that the architectural register in a set is temporarily usable as a renaming register by executing an instruction that indicates said architectural register is not currently being used for a thread.

14. The register resource of claim 12, wherein the register handler reassigns any renaming registers that have been assigned to architectural registers in a set corresponding to an idle hardware context to new registers to enable the idle hardware context to support execution of a new thread.

* * * * *

UNITED STATES PATENT AND TRADEMARK OFFICE
CERTIFICATE OF CORRECTION

PATENT NO. : 6,092,175
DATED : July 18, 2000
INVENTOR(S) : Levy et al.

It is certified that error appears in the above-identified patent and that said Letters Patent is hereby corrected as shown below:

Item [56], Other Publications,
Please add the following references:

-- Capitanio, Andrea, Nikil Dutt, and Alexandru Nicolau. "Partitioned Register Files for VLIWs: A Preliminary Analysis of Tradeoffs." IEEE: 9/92. 9 pages.

Farkas, Keith I., Norman P. Jouppi, and Paul Chow. "Register File Design Considerations in Dynamically Scheduled Processors." IEEE. 4/96. 12 pages.

Janssen, Johan and Henk Corporaal. "Partitioned Register File for TTAs." IEEE: Proceedings of MICRO-28. 1/95. 10 pages.

Kiyohara, Tokuzo, Scott Mahlke, William Chen, Roger Bringmann, Richard Hank, Sadun Anik, and Wen-mei Hwu. "Register Connection: A New Approach to Adding Registers into Instruction Set Architectures." IEEE. 5/93. 10 pages.

Llosa, Josep, Mateo Valero, and Eduard Ayguade. "Non-Consistent Dual Register Files to Reduce Register Pressure." IEEE. 2/95. 10 pages.

Nuth, Peter R. and William J. Dally. "The Named-State Register File: Implementation and Performance." IEEE. 2/95. 10 pages.

Tremblay, Marc, Bill Joy, and Ken Shin. "A Three Dimensional Register File for Superscalar Processors." IEEE. 5/95. 11 pages.

Waldspurger, Carl A. "Register Relocation: Flexible Contexts for Multithreading." IEEE. 5/93. 11 pages.

Gulati, Manu. Multithreading on a Superscalar Microprocessor. Thesis. University of California Irvine. 1995. 102 pages.

Gulati, Manu and Bagherzadeh, Nader. Performance Study of a Multithreaded Superscalar Microprocessor. Proc. HPCA-2, Feb. 1996, pp. 291-301.

Loikkanen, Mat and Bagherzadeh, Nader. A Fine-Grain Multithreading Superscalar Architecture. Proc. PACT96, Oct. 1996. pp. 163-168.

Sigmund, Ulrich and Ungerer, Theo. Identifying Bottlenecks in a Multithreaded Supercalar Microprocessor. Lec. Notes Comput. Sc. 1123 (1996), pp. 797-800.

UNITED STATES PATENT AND TRADEMARK OFFICE
CERTIFICATE OF CORRECTION

PATENT NO.   : 6,092,175
DATED        : July 18, 2000
INVENTOR(S)  : Levy et al.

It is certified that error appears in the above-identified patent and that said Letters Patent is hereby corrected as shown below:

Silc, Jurij, Robic, Borut and Ungerer, Theo. Asynchrony in Parallel Computing: From Dataflow to Multithreading. Parallel and Distributed Computer Practices, Vol. 1, No. 1, March 1988. Online. October 28, 1999. Available http://www-csd.ujs.si/silc/pdcp.html.

Ungerer, T. and Sigmund, U. Evaluating a Multithreaded Superscalar Microprocessor Versus a Multiprocessor Chip. Proc. $4^{th}$ Parallel Systems and Algorithms Workshop. April 1996.

Wallace, Steve and Bagherzadeh, Nader. A Scalable Register File Architecture for Dynamically Scheduled Processors. Published in the Proceedings of the International Conference on Parallel Architectures and Compilation Techniques '96, October 21-23, 1996, Boston, MA © 1997 IEEE. --.

Column 4,
Line 43, "FIGS. 14A-46G" should read -- FIGURES 14A-14G --.

Column 12,
Line 28, "F5R32" should read -- FSR32 --.

(Table 2,)
Column 13,
Line 16, "Floating Point (EP) Registers" should read -- Floating Point (FP) Registers --.

(Table 3,)
Column 13,
Line 38, "DNT" should read -- INT --.

Signed and Sealed this

Thirteenth day of November, 2001

*Attest:*

NICHOLAS P. GODICI
*Attesting Officer*         *Acting Director of the United States Patent and Trademark Office*